(12) United States Patent
Levers et al.

(10) Patent No.: US 12,546,689 B2
(45) Date of Patent: Feb. 10, 2026

(54) CARTRIDGE FOR PROCESSING BIOLOGICAL SAMPLES AND DEVICES AND METHODS THEREOF

(71) Applicant: Cellsonics Inc., San Jose, CA (US)

(72) Inventors: Stephen Levers, San Jose, CA (US); Vibhu Vivek, Santa Clara, CA (US); Douglas Gordon Summers, Palo Alto, CA (US)

(73) Assignee: Cellsonics Inc., San Jose, CA (US)

( * ) Notice: Subject to any disclaimer, the term of this patent is extended or adjusted under 35 U.S.C. 154(b) by 881 days.

(21) Appl. No.: 17/061,322

(22) Filed: Oct. 1, 2020

(65) Prior Publication Data

US 2021/0102875 A1    Apr. 8, 2021

Related U.S. Application Data

(60) Provisional application No. 62/909,476, filed on Oct. 2, 2019.

(51) Int. Cl.
*G01N 1/40* (2006.01)
*C12M 1/00* (2006.01)
(Continued)

(52) U.S. Cl.
CPC ........... *G01N 1/4077* (2013.01); *C12M 23/06* (2013.01); *C12M 23/38* (2013.01); *C12M 23/42* (2013.01);
(Continued)

(58) Field of Classification Search
CPC ................. G01N 1/4077; G01N 1/286; G01N 2001/2866; G01N 2001/4094;
(Continued)

(56) References Cited

U.S. PATENT DOCUMENTS 4,874,137 A * 10/1989 Chiba .................... C12N 1/066
                                                                    241/1
6,578,659 B2 * 6/2003 Manna .................... B01F 31/85
                                                                    422/128
(Continued)

FOREIGN PATENT DOCUMENTS

CN          101301632 A      11/2008
CN          104703699 A       6/2015
(Continued)

OTHER PUBLICATIONS

International Preliminary Report on Patentability for PCT Application No. PCT/US2020/053835, issued on Apr. 5, 2022, filed on Oct. 1, 2020, 12 pages.
(Continued)

*Primary Examiner* — William H. Beisner
*Assistant Examiner* — Danielle B Henkel
(74) *Attorney, Agent, or Firm* — MORRISON & FOERSTER LLP

(57) ABSTRACT

Described are methods and systems for enhanced dissociation of cells from a solid biological tissue sample. In some embodiments, a self-contained cartridge apparatus includes a first chamber for receiving the tissue sample, enables ultrasonic energy from a transducer assembly of a processing unit to dissociate cells from the sample in the first chamber, and collect viable cells of interest from an aqueous suspension in a second chamber fluidly connected to the first chamber via a channel. In some embodiments, to enhance dissociation of viable cells, a filter device includes a tubular body configured to be telescopically inserted into a container containing the tissue sample in an aqueous fluid. The filter device also includes a cell-filter mesh that covers a bottom opening of the tubular body and that is configured to
(Continued)

compress the tissue sample to expel cells from the sample when the filter device is fully inserted into the container.

13 Claims, 13 Drawing Sheets

(51) Int. Cl.
*C12M 1/12* (2006.01)
*C12M 1/26* (2006.01)
*C12M 3/00* (2006.01)
*C12M 3/06* (2006.01)
*G01N 1/28* (2006.01)

(52) U.S. Cl.
CPC ............ *C12M 27/16* (2013.01); *C12M 29/20* (2013.01); *C12M 33/14* (2013.01); *C12M 37/04* (2013.01); *G01N 1/286* (2013.01); *G01N 2001/2866* (2013.01); *G01N 2001/4094* (2013.01)

(58) Field of Classification Search
CPC ...... C12M 23/06; C12M 23/38; C12M 23/42; C12M 27/16; C12M 29/20; C12M 33/14; C12M 37/04
See application file for complete search history.

(56) References Cited

U.S. PATENT DOCUMENTS

| | | | |
|---|---|---|---|
| 6,682,214 B1 | 1/2004 | Vivek | |
| 8,127,614 B2 | 3/2012 | Vivek et al. | |
| 8,319,398 B2 | 11/2012 | Vivek | |
| 8,871,159 B1* | 10/2014 | Apfel | G01N 1/286 422/65 |
| 2002/0197631 A1* | 12/2002 | Lawrence | B01L 3/502 435/270 |
| 2003/0038087 A1* | 2/2003 | Garvin | B01D 61/14 435/2 |
| 2005/0070944 A1* | 3/2005 | Holl | C12M 47/06 606/180 |
| 2010/0279389 A1* | 11/2010 | Ziller | C12M 27/20 435/257.1 |
| 2011/0281319 A1 | 11/2011 | Swayze | |
| 2013/0199298 A1 | 8/2013 | Vivek et al. | |
| 2014/0206074 A1* | 7/2014 | Peterson | C12Q 1/6844 435/306.1 |
| 2014/0315303 A1* | 10/2014 | Huang | B01L 3/502 435/366 |
| 2016/0199837 A1* | 7/2016 | Breinlinger | B01L 3/50273 435/308.1 |
| 2017/0137774 A1 | 5/2017 | Lipkens | |
| 2017/0225163 A1* | 8/2017 | Ludwig | B01L 3/567 |
| 2019/0212233 A1* | 7/2019 | Jovanovich | G01N 35/026 |
| 2020/0070165 A1* | 3/2020 | Shuler | C12M 23/16 |
| 2021/0102187 A1 | 4/2021 | Vivek et al. | |
| 2021/0231538 A1* | 7/2021 | Goldsborough | G01N 1/286 |

FOREIGN PATENT DOCUMENTS

| | | |
|---|---|---|
| CN | 105188933 A | 12/2015 |
| CN | 109790934 A | 5/2019 |
| CN | 110072402 A | 7/2019 |
| CN | 103608110 A | 2/2024 |
| WO | 2018102471 A1 | 6/2018 |

OTHER PUBLICATIONS

International Search Report for PCT Application No. PCT/US2020/053835, mailed on Mar. 9, 2021, filed on Oct. 1, 2020, 21 pages.

\* cited by examiner

600

602 — Telescopically insert a tubular body of a filter device into a container containing a solid biological tissue sample in an aqueous fluid 604 — Fully insert the tubular body in the container to compress the biological tissue sample with a cell-filter mesh covering a bottom opening of the tubular body

| | Sample No. | Tissue Type | Weight (mg) | Enzyme | Mincing | Sonication (2min) | Total Cells/mL | Total Volume (mL) | Total Cells | Total Viable Cells/mL | Total Viable Cells | Total Cells/mg | Total Viable Cells/mg | Total Viable Cells/mg Cumulative |
|---|---|---|---|---|---|---|---|---|---|---|---|---|---|---|
| BLU/Moosh Fractions | | 9-Feb | | | | | | | | | | | | |
| CELL_PIG_LIV Combined | 1-1 | Pig Liver | 41.3 | No | No | Yes | 3,730,000 | 0.315 | 1,174,950 | 569,000 | 179,235 | 28,449 | 4,340 | 4,340 |
| | 1-2 | | | No | No | Yes | 6,680,000 | 0.71 | 4,742,800 | 1,320,000 | 937,200 | 114,838 | 22,692 | 27,032 |
| Counts reported based on average of 2 readings per sample | 1-3 | | | No | No | Yes | 3,760,000 | 0.43 | 1,616,800 | 577,000 | 248,110 | 39,148 | 6,008 | 33,040 |
| | 1-4 | | | No | No | Yes | 2,055,000 | 0.57 | 1,171,350 | 253,000 | 144,210 | 28,362 | 3,492 | 36,532 |
| | 1-5 | | | No | No | Yes | 1,215,000 | 0.53 | 643,950 | 163,500 | 86,655 | 15,592 | 2,098 | 38,630 |
| | 1-6 | | | No | No | Yes | 836,000 | 0.57 | 476,520 | 84,400 | 48,108 | 11,538 | 1,165 | 39,795 |
| | Cumulative Total | | | | | | 18,276,000 | 3.125 | 9,826,370 | | 1,643,518 | 237,927 | 39,795 | |
| One 2 Min BLU + 6 Moosh & 1:10 dilution | | | | | | | | | | | | | | |
| | 3.1 | Pig Liver | 45 | No | No | Yes | 37,100,000 | 0.555 | 21,062,250 | 3,920,000 | | | | |
| | 9-Feb | | | | | | 38,800,000 | | | 8,440,000 | | | | |
| | | | | | | Average | 37,950,000 | | | 6,180,000 | 3,429,900 | 468,050 | 76,220 | |
| Reporting 1 count reading from the sample | 4.1 | Pig Liver | 45 | No | No | Yes | 28,400,000 | 0.555 | 15,762,000 | 5,940,000 | | | | |
| | 9-Feb | | | | | | 28,400,000 | | | 5,940,000 | 3,296,700 | 350,267 | 73,260 | |
| | | | | | | Average | | | | | Average | | 74,740 | |

802 (top section), 810 (bottom section)

FIG. 8

CARTRIDGE FOR PROCESSING BIOLOGICAL SAMPLES AND DEVICES AND METHODS THEREOF

CROSS-REFERENCE TO RELATED APPLICATIONS

This application claims the priority benefit of U.S. Provisional Application No. 62/909,476, filed on Oct. 2, 2019, the content of which is incorporated herein by reference in its entirety.

FIELD OF THE DISCLOSURE

The present disclosure relates generally to systems and methods for processing a solid biological tissue sample in a self-contained cartridge and, more specifically, for using ultrasonic energy to dissociate single cells from the biological tissue samples in the self-contained cartridge.

BACKGROUND OF THE DISCLOSURE

The conventional approach to dissociate single cells from solid biological tissue samples requires the use of proteolytic enzymes with incubation at 37° C. and mechanical disruption to digest or disrupt cellular adhesion molecules and/or the underlying extracellular matrix. For example, the mechanical disruption may include a manual trituration (e.g., moving minced tissue up and down inside a pipette) or mechanical mixers/disruptors (e.g., a Miltenyi gentleMACS™ dissociator) followed by centrifugation and pouring of the processed tissue sample through filters to remove the enzymes and recover dissociated viable cells in a cell suspension (e.g., an aqueous suspension).

Using enzymes and mechanical disruption for cell dissociation, however, is inefficient and results in high losses or degradation of cell populations of interest. For example, many cells are lost or broken (i.e., no longer intact) due to the physical stress of processing by pipetting, centrifugation and filtration, as well as during the transfer of the tissue sample from container to container for processing. Additionally, viable cell populations are lost due to the enzymes used, concentration of enzymes used, and processing temperatures and long incubation time required to use such enzymes. The stress induced by enzymatic dissociation also results in the up regulation of pro-inflammatory and stress induced genes not present in the original tissue sample. Therefore, the gene expression profile of dissociated cells of interest commonly differ from the gene profile of the original tissue sample.

Current cell dissociation methods are also commonly manual processes that requires a user to transfer the tissue sample from container to container to obtain viable dissociated cells. For example, the user may need to mix the enzyme and the biological tissue sample in a first container, transfer the mixture to a second container to perform mechanical disruption to obtain dissociated cells, and then transfer the mixture from the second container to a third container to filter the mixture to obtain viable cells of interest. The process of transferring the mixture exposes the tissue sample to environmental contamination, which may render experiments or tests inaccurate.

SUMMARY OF THE DISCLOSURE

As discussed above, using enzymes and mechanical disruptors to dissociate single cells from a biological tissue sample is suboptimal and leads to high losses or degradation of cell populations of interest. There is a need, therefore, for systems, methods, and techniques for improved cell dissociation while retaining the gene expression profile of viable cells dissociated from the tissue sample.

In some embodiments, instead of using enzymes to perform cell dissociation, an ultrasonic processing device can be used to direct ultrasonic energy at the tissue sample to perform cell dissociation. This approach eliminates the drawbacks discussed above with respect to using enzymes. While the quality and quantity of dissociated cells may improve when using an ultrasonic energy-based dissociation method as compared to enzymatic dissociation, the results achieved are limited by the need to perform essential sample processing steps in other devices before and after the ultrasonic energy is applied to the tissue sample.

In particular, conventional liquid handling techniques need to be integrated to complete the workflow from solid tissue samples to cells in suspension ready to be safely transferred for downstream cell isolation and analytical techniques. These conventional techniques include mincing the tissue sample in open petri dishes, pipetting the minced tissue prior to dissociation as well as pipetting (e.g., aspiration and dispense) of the dissociated sample along with enzymes or chemical reagents, and transporting the sample between various receptacles, centrifuges, ice baths, instruments and filtration devices to isolate cells of interest in a clean suspension. As discussed above, conventional liquid handling techniques are time intensive and exposes tissue sample to environmental contamination.

In some embodiments, an improved system for processing a solid biological tissue sample includes a self-contained cartridge apparatus that is configured to load the tissue sample, enable ultrasonic energy to dissociate single cells from the tissue sample in a suspension, and collect viable cells of interest from the suspension without the use of pipettes, centrifugation or enzymes, heat and extended processing times. By performing cell dissociation and viable cell collection processes within the self-contained cartridge apparatus, the improved system achieves higher quality results because the dissociated cells are not exposed to the external environment. Moreover, because enzymes are not utilized in the cartridge apparatus, the gene expression profile of the dissociated cells in the cartridge apparatus is closely aligned with the gene expression profile of the native tissue, i.e., the tissue sample originally loaded into the cartridge apparatus.

In some embodiments, an apparatus for dissociating single cells from a solid biological tissue sample, comprises: a housing unit configured to enable the apparatus to be loadable into an ultrasonic processing device; a first chamber configured to receive the solid biological tissue sample and an aqueous fluid, wherein the first chamber is aligned with a transducer assembly of the processing device when the apparatus is loaded in the processing device to enable ultrasonic energy applied by the processing device to dissociate cells from the biological tissue sample to result in an aqueous suspension; a channel fluidly connecting the first chamber to a second chamber; and the second chamber configured to collect the dissociated cells within the aqueous suspension that flows through the channel from the first chamber.

In some embodiments, the second chamber is detachable from the apparatus.

In some embodiments, the first chamber comprises a first inlet for receiving the solid tissue sample and the aqueous fluid from outside of the apparatus. In some embodiments, the first chamber comprises a lid to seal the received solid tissue sample and the aqueous fluid from an exterior environment.

In some embodiments, the first chamber comprises a bottom surface that is acoustically conductive to enable the ultrasonic energy to enter the first chamber to dissociate cells from the biological tissue. In some embodiments of the apparatus, the bottom surface comprises a flat layer configured to couple to the transducer assembly when the apparatus is loaded in the processing device.

In some embodiments, the aqueous fluid comprises a cell media solution.

In some embodiments, the apparatus comprises a connector component coupled to the channel and configured to connect with an actuating device of the processing device, wherein the actuating device is configured to control flow of fluids through the channel. In some embodiments, the actuating device comprises a pump or a plunger. In some embodiments, the connector component comprises a fitting or an adaptor configured to connect the channel the actuating device.

In some embodiments, the apparatus comprises a valve positioned in the channel and configured to be controlled by an actuating device of the processing device to control flow of fluids through the channel.

In some embodiments, the apparatus comprises a third chamber including a third inlet for receiving second aqueous fluid into the interior of the apparatus. In some embodiments, the apparatus comprises a channel that fluidly couples the third chamber to the first chamber to enable the second aqueous fluid to flow into the first chamber.

In some embodiments, the apparatus comprises a series of two or more filtration chambers that connect the first chamber to the second chamber, wherein the channel comprises a plurality of sub-channels that fluidly connect successive chambers in the series of two or more filtration chambers to enable the aqueous fluid to flow from the first chamber to the second chamber. In some embodiments of the apparatus, the two or more filtration chambers are configured to capture effluent materials in the aqueous fluid as the aqueous fluid flows through the plurality of sub-channels to enable targeted components to be collected in the second chamber. In some embodiments, the effluent materials comprises non-targeted components, cellular debris, and extracellular debris.

In some embodiments, a filtration chamber from the two or more filtration chambers comprises one or more marker beads configured to bind to the effluent materials to prevent the effluent materials from flowing through the filtration chamber.

In some embodiments, a filtration chamber from the two or more filtration chambers is configured to be aligned with a second transducer assembly of the processing device when the apparatus is loaded in the processing device, and wherein the filtration chamber comprises a bottom surface that acoustically couples the filtration chamber to the second transducer assembly to receive ultrasonic energy from the processing device to promote the selective flow of the targeted components.

In some embodiments, the second chamber is configured to collect the targeted intracellular or extracellular analytes of interest, and wherein the apparatus comprises a one-way channel that fluidly connects the second chamber to the first chamber to enable aqueous fluid to flow back to the first chamber.

In some embodiments, the plurality of sub-channels is configured to allow the aqueous fluid to flow back through the series of two or more filtration chambers without backflowing into the first chamber.

In some embodiments, a method for dissociating single cells from a solid biological tissue sample comprises: introducing the solid biological tissue sample and an aqueous liquid into a first chamber of a cartridge apparatus; loading the cartridge apparatus into an ultrasonic processing device, wherein the first chamber is aligned with a transducer assembly of the processing device; activating the ultrasonic processing device to apply ultrasonic energy from the transducer assembly to ultrasonically dissociate cells from the tissue sample to result in an aqueous suspension in the first chamber; and controlling the aqueous suspension to flow from the first chamber to a second chamber of the cartridge apparatus, wherein the second chamber is configured to collect dissociated cells within the aqueous suspension.

In some embodiments, the method comprises mincing the tissue sample within the first chamber. In some embodiments, mincing the tissue sample comprises inserting a pestle apparatus and a mortar apparatus into the container; and mincing the tissue sample using the inserted pestle apparatus and the mortar apparatus.

In some embodiments, the method comprises detaching the second chamber from the cartridge apparatus.

In some embodiments, the method comprises receiving, via a first inlet of the first chamber, the solid tissue sample and the aqueous fluid from outside of the apparatus.

In some embodiments, the first chamber comprises a lid, and the method comprises sealing the received solid tissue sample and the aqueous fluid from an exterior environment by closing the lid.

In some embodiments, the first chamber comprises a bottom surface that is acoustically conductive to enable the ultrasonic energy to enter the first chamber to dissociate cells from the biological tissue. In some embodiments, the bottom surface comprises a flat layer and the method comprises coupling the flat layer of the cartridge apparatus to the transducer assembly when the cartridge apparatus is loaded in the processing device.

In some embodiments, the aqueous fluid comprises a cell media solution.

In some embodiments, the cartridge apparatus comprises a connector component coupled to the channel, and the method comprises connecting the channel with an actuating device of the processing device using the connector component, wherein the actuating device is configured to control flow of fluids through the channel. In some embodiments, the actuating device comprises a pump or a plunger. In some embodiments, the connector component comprises a fitting or an adaptor configured to connect the channel the actuating device.

In some embodiments, the cartridge apparatus comprises a valve positioned in the channel, and the method comprises operating the valve by an actuating device of the processing device to control flow of fluids through the channel.

In some embodiments, the cartridge apparatus comprises a third chamber including a third inlet, and the method comprises receiving second aqueous fluid into the interior of the apparatus via the third inlet.

In some embodiments, the method comprises fluidly coupling the third chamber to the first chamber via a channel to enable the second aqueous fluid to flow into the first chamber.

In some embodiments, the cartridge apparatus comprises a series of two or more filtration chambers that connect the first chamber to the second chamber, and wherein the channel comprises a plurality of sub-channels that fluidly connect successive chambers in the series of two or more filtration chambers to enable the aqueous fluid to flow from the first chamber to the second chamber.

In some embodiments, the method comprises aligning a filtration chamber from the two or more filtration chambers with a second transducer assembly of the processing device when the cartridge apparatus is loaded in the processing device, wherein the filtration chamber comprises a bottom surface that acoustically couples the filtration chamber to the second transducer assembly to receive ultrasonic energy from the processing device to promote the selective flow of the targeted components.

In some embodiments, a filter device for enhanced dissociation of viable cells from a solid biological tissue sample comprises: a tubular body configured to be telescopically inserted into a container containing a biological tissue sample in an aqueous fluid; and a cell-filter mesh covering a bottom opening of the tubular body, wherein the cell-filter mesh is configured to compress the biological tissue sample to expel cells from the tissue sample when the filter device is fully inserted into the container.

In some embodiments, the cells are expelled into a surrounding aqueous fluid that flows into the center of the tubular body through the cell-filter mesh.

In some embodiments, the filter devices comprises a transport channel that transports the expelled cells that flows into the center of the tubular body to a collection chamber. In some embodiments, the transport channel comprises a tube that runs inside and along the length of the tubular body.

In some embodiments, a lower portion of the tubular body is submerged in the container when the tubular body is fully inserted into the container, and wherein the lower portion comprises one or more openings covered by one or more corresponding cell-filter meshes.

In some embodiments, the cells are expelled into a surrounding aqueous fluid that flows into the center of the tubular body through the one or more cell-filter meshes corresponding to the one or more openings of the lower portion.

In some embodiments, the tubular body is configured to be extended into the container by at most a predetermined distance to enable the cell-filter mesh to compress the biological tissue sample.

In some embodiments, the tubular body comprises a raised portion that prevents the tubular body from being extended further than the predetermined distance into the container.

In some embodiments, the container comprises a stopper material at the bottom of the container that prevents the tubular body from being extended more than the predetermined distance into the container. In some embodiments, the stopper material comprises a sponge, rubber, or plastic.

In some embodiments, the biological tissue sample is ultrasonically dissociated into cells before being compressed by the cell-filter mesh.

In some embodiments, the biological tissue sample is enzymatically dissociated into cells before being compressed by the cell-filter mesh.

In some embodiments, the container corresponds to a reaction chamber of a cartridge apparatus.

In some embodiments, a method for enhanced dissociation of viable cells from a solid biological tissue sample comprises: telescopically inserting a tubular body of the filter device into a container containing a biological tissue sample in an aqueous fluid, wherein the filter device comprises a cell-filter mesh that covers a bottom opening of the tubular body; fully inserting the tubular body of the filter device in the container to compress the biological tissue sample with the cell-filter mesh, wherein the cell-filter mesh compresses the biological tissue sample to expel cells from the tissue sample.

In some embodiments, the method comprises: withdrawing the tubular body of the filter device from the container; and iteratively performing the fully inserting and the withdrawing of the tubular body of the filter device to repeatedly compress the biological tissue sample to increase an amount of expelled cells.

In some embodiments, the cells are expelled into a surrounding aqueous fluid that flows into the center of the tubular body through the cell-filter mesh.

In some embodiments, the method comprises transporting the expelled cells that flows into the center of the tubular body to a collection chamber. In some embodiments, the transport channel comprises a tube that runs inside and along the length of the tubular body.

In some embodiments, the method comprises submerging a lower portion of the tubular body in the container when the tubular body is fully inserted into the container, wherein the lower portion comprises one or more openings covered by one or more corresponding cell-filter meshes.

In some embodiments, the cells are expelled into a surrounding aqueous fluid that flows into the center of the tubular body through the one or more cell-filter meshes corresponding to the one or more openings of the lower portion.

In some embodiments, the method comprises extending the tubular body into the container by at most a predetermined distance to enable the cell-filter mesh to compress the biological tissue sample.

In some embodiments, the tubular body comprises a raised portion that prevents the tubular body from being extended further than the predetermined distance into the container.

In some embodiments, the container comprises a stopper material at the bottom of the container that prevents the tubular body from being extended more than the predetermined distance into the container. In some embodiments, the stopper material comprises a sponge, rubber, or plastic.

In some embodiments, the method comprises ultrasonically dissociating the tissue sample into cells before telescopically inserting the tubular body of the filter to compress the tissue sample by the cell-filter mesh.

In some embodiments, the method comprises enzymatically dissociating the tissue sample into cells before telescopically inserting the tubular body of the filter to compress the tissue sample by the cell-filter mesh.

In some embodiments, the container corresponds to a reaction chamber of a cartridge apparatus.

In some aspects, provided herein is a cartridge for dissociating and obtaining separated individual cells from a biological sample, the cartridge comprising: (a) a sample processing unit comprising: a sealable port configured to receive the biological sample for introduction to the sample processing unit; a sample chamber configured to collect the biological sample; and a mincer, wherein the mincer is configured to interface with the sample chamber; (b) a reaction unit comprising a reaction chamber configured to receive ultrasonic energy, wherein the sample processing unit and the reaction unit are connected via a first channel; (c) a filtration unit comprising: a filtration chamber; and a filtration device configured to enter the filtration chamber, wherein the reaction chamber and the filtration unit are connected via a second channel; and (d) a collection unit configured to receive the separated individual cells from the biological sample, wherein the filtration unit and the collection unit are connected via a third channel.

In some embodiments, the cartridge further comprises a first gate configured to control the fluidic connection between: the sample processing unit and the reaction unit via the first channel; and/or the reaction unit and the filtration unit via the second channel. In some embodiments, the first gate is configured to be positioned in a first location, and wherein when the first gate is in the first position the sample processing unit and the reaction unit are fluidically connected and the reaction unit and the filtration unit are not fluidically connected. In some embodiments, the first gate is configured to be positioned in a second location, and wherein when the first gate is in the second position the reaction unit and the filtration unit are fluidically connected and the sample processing unit and the reaction unit are not fluidically connected.

In some embodiments, the cartridge further comprises a second gate configured to control the fluidic connection between the filtration unit and the collection unit via the third channel. In some embodiments, the second gate is configured to be position in a first location, wherein when the second gate is in the first position the filtration unit and the collection unit are not fluidically connected. In some embodiments, the second gate is configured to be position in a second location, wherein when the second gate is in the second position the filtration unit and the collection unit are fluidically connected.

In some embodiments, the first channel, the second channel, and the third channel are positioned and configured such that flow between the sample processing unit, the reaction unit, the filtration unit, and the collection unit is controlled by tilting of the cartridge. In some embodiments, the tilting of the cartridge occurs via a single axis. In some embodiments, the single axis is substantially perpendicular to any one or more of the following axes: an axis that is substantially parallel with the rod of the mincer and/or the direction of motion of the mincer; an axis that substantially perpendicular with the bottom of the reaction chamber; and an axis that is substantially parallel with the motion of the filtration device. In some embodiments, the sample processing unit, the reaction unit, the filtration unit, and the collection unit are configured to sit on a plane, wherein the single axis of tilting of the cartridge is substantially perpendicular to the plane.

In some embodiments, the sealable port of the sample processing unit is also configured to receive a fluid for introduction to the sample processing unit. In some embodiments, the sealable port comprises a wall, wherein the sealable port of the sample processing unit slopes toward the sample chamber.

In some embodiments, the cartridge further comprises a cap configured to seal the sealable port of the sample processing unit.

In some embodiments, the sample chamber comprises one or more centrally sloping walls.

In some embodiments, the reaction chamber of the reaction unit comprises a bottom surface that is acoustically conductive. In some embodiments, the bottom surface of the reaction chamber is substantially flat. In some embodiments, the reaction chamber of the reaction unit comprises a cylindrical wall.

In some embodiments, the filtration device of the filtration unit comprises a tubular assembly, wherein an outer surface of the tubular assembly is configured to provide a seal with a side wall of the filtration chamber, and wherein the tubular assembly comprises a cell-filter mesh covering a bottom opening of the tubular assembly. In some embodiments, the side wall of the filtration chamber is cylindrical.

In some embodiments, the filtration chamber of the filtration unit comprises a bottom surface having a convex structure. In some embodiments, the filtration unit comprises a vent.

In some embodiments, the collection unit is configured to receive a removable collection device for receiving single cells from the biological sample. In some embodiments, the removable collection device is an Eppendorf tube.

In some embodiments, the cartridge is configured to be loadable into an ultrasonic processing device.

In some aspects, provided herein is an ultrasonic processing device comprising: (a) an ultrasonic transducer; (b) a temperature-controlled water bath; (c) a tilting assembly, wherein the tilting assembly is configured to hold a cartridge of any one of embodiments 65-86 such that (i) a reaction chamber of the cartridge is positioned relative to the ultrasonic transducer, and (ii) the reaction chamber, a sample chamber, and a filtration chamber of the cartridge, or portions thereof, are positioned relative to a water level of the temperature-controlled water bath, the tilting assembly comprising: a tilting actuator; a mincer actuator; and a filter actuator; and (d) a control unit.

In some embodiments, the ultrasonic processing device further comprises one or more gate actuators each configured to interface with a gate of the cartridge. In some embodiments, the tilting assembly is configured to hold the cartridge such that when a removable collection device is placed in a collection unit of the cartridge, the removable collection device, or a portion thereof, is positioned relative to the water level of the temperature-controlled water bath. In some embodiments, the reaction chamber, the sample chamber, and the filtration chamber, and the removable collection device, or portions thereof, are below the water level of the temperature-controlled water bath.

In some embodiments, the mincer actuator comprises a clip to interface with a mincer of the cartridge. In some embodiments, the filter actuator comprises a clip to interface with a filtration device of the cartridge.

In some embodiments, the control unit comprises: one or more processors; and a memory storing one or more programs, the one or more programs configured to be executed by the one or more processors, the one or more programs including instructions for executing a method for dissociating and obtaining separated individual cells from a biological sample. In some embodiments, the instructions for executing the method for dissociation and obtaining separated individual cells from the biological sample comprise instructions for any one or more of: operating the ultrasonic transducer; operating the tilting actuator; operating mincer actuator; operating the filter actuator; operating one or more gate actuators; and operating the temperature-controlled water bath.

In some aspects, provided herein is a method for obtaining separated individual cells from a biological sample, the method comprising: loading a cartridge of any one of the embodiments described herein into an ultrasonic processing device of any one of the embodiments described herein; loading a biological sample into a sample processing unit of the cartridge via a sealable port; and commencing a programmed method of the ultrasonic processing device to dissociate and obtain separated individual cells from the biological sample.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings:

FIG. 6 illustrates a method for operating a filter device to enhance dissociation of viable cells from a solid biological tissue sample, according to some embodiments;

FIG. 8 is a table that shows representative quantities of obtained viable cells when a pig liver tissue was ultrasonically dissociated versus ultrasonically dissociated and filter pressed;

DETAILED DESCRIPTION

Figure 1:
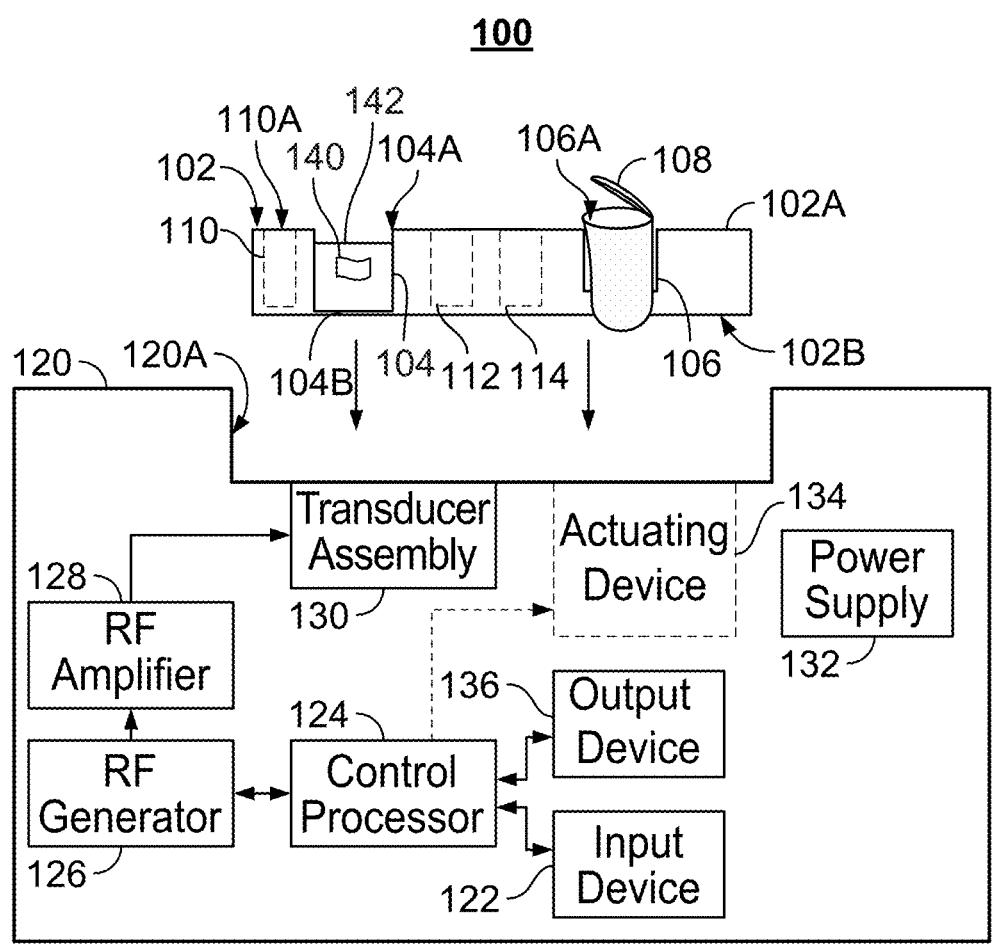
FIG. 1 illustrates a cross-sectional view of a system for processing a solid biological tissue sample in a cartridge apparatus, according to some embodiments.

In some aspects, provided herein are cartridges useful for processing a biological sample comprising a plurality of cells to obtain a composition comprising separated individual cells from the plurality of cells. In some embodiments, the cartridge is a single-use, disposable cartridge. In some embodiments, the cartridge is configured to subject the biological sample, or a portion thereof, to a dissociating force, such as ultrasonic energy. In some embodiments, the cartridge is be configured to receive a biological sample, such as a solid biological tissue sample, perform preliminary processing of the biological sample, facilitate the application of bulk ultrasonic energy to dissociate single cells in the biological sample, and filter and collect viable cells of interest from the dissociated cells without substantially changing the separated individual cells as compared to their state when in the biological sample, such as substantially changing the gene expression profile of the separated individual cells. In some embodiments, the bulk ultrasonic energy can be generated by an ultrasonic processing device, as described with respect to U.S. Pat. Nos. 8,319,398; 8,127,614; and 6,682,214, the contents of each of which are herein incorporated by reference in their entireties. In other aspects, described herein are systems, devices, and methods for processing biological samples, such as solid biological tissue samples, in the self-contained cartridges described herein.

As used herein, the singular forms "a," "an," and "the" include the plural references unless the context clearly dictates otherwise.

Reference to "about" a value or parameter herein includes (and describes) variations that are directed to that value or parameter per se. For example, description referring to "about X" includes description of "X."

The terms "comprising," "having," "containing," and "including," and other similar forms, and grammatical equivalents thereof, as used herein, are intended to be equivalent in meaning and to be open ended in that an item or items following any one of these words is not meant to be an exhaustive listing of such item or items, or meant to be limited to only the listed item or items. For example, an article "comprising" components A, B, and C can consist of (i.e., contain only) components A, B, and C, or can contain not only components A, B, and C but also one or more other components. As such, it is intended and understood that "comprises" and similar forms thereof, and grammatical equivalents thereof, include disclosure of embodiments of "consisting essentially of" or "consisting of."

It is understood that aspects and variations of the invention described herein include "consisting" and/or "consisting essentially of" aspects and variations.

When a range of values is provided, it is to be understood that each intervening value between the upper and lower limit of that range, and any other stated or intervening value in that states range, is encompassed within the scope of the present disclosure. Where the stated range includes upper or lower limits, ranges excluding either of those included limits are also included in the present disclosure.

The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

The disclosures of all publications, patents, and patent applications referred to herein are each hereby incorporated by reference in their entireties. To the extent that any reference incorporated by reference conflicts with the instant disclosure, the instant disclosure shall control.

In some aspects, the cartridges described herein are configured to perform any one or more of: (i) receiving a biological sample; (ii) receiving additional material inputs useful for processing the biological sample, such as an aqueous solution, e.g., a buffer; (iii) processing of the biological sample, such as via mincing; (iv) subjecting the biological sample, or a portion thereof, to a dissociating force, such as ultrasonic energy; (v) filtering the biological sample, or the portion thereof, to separate individual cell of the biological sample; and (vi) collecting the separated individual cells of the biological samples. In some embodiments, the cartridge comprises modules useful for performing the functions for processing the biological sample. In some embodiments, the cartridge comprises a module that is configured to perform one or more functions involved in obtaining separated individual cells of a biological sample. In some embodiments, the cartridge comprises a plurality of modules, wherein each module is configured to perform a specific function or a set of functions involved in obtaining separated individual cells of a biological sample. For example, in some embodiments, the cartridge comprises a sample processing unit, a reaction unit, a filtration unit, and a collection unit. In some embodiments, the sample processing unit is configured to receive a biological sample and any additional material input into the cartridge, such as an aqueous solution, e.g., a buffer. In some embodiments, the sample processing unit is configured to process the biological sample, such as via subjecting the biological sample to mincing via a mincer. In some embodiments, the reaction unit is configured to subject the biological sample, or a portion thereof, to a dissociating force, such as ultrasonic energy. In some embodiments, the filtration unit is configured to filter the biological sample, or the portion thereof, to separate, such as isolate, individual cells of the biological sample. In some embodiments, the collection unit is configured to collect separated individual cells of the biological sample. In some embodiments, the separated individual cells are collected in a removable collection device, such as an Eppendorf tube. In some embodiments, the collection unit comprises a feature to engage and create a seal with the removable collection device. In some embodiments, wherein the cartridge comprises a plurality of modules, the cartridge further comprises channels for fluidically connecting the various modules. In some embodiments, the channels are configured based on the desired flow of material from one module to another module. In some embodiments, the cartridge comprise one or more gates for controlling the flow of material from one module to another module. In some embodiments, the cartridge is configured such that material in the cartridge may be manipulated, such as moved, using gravitational forces, e.g., via tipping the cartridge.

In some aspects, provided herein is a cartridge for processing a biological sample, such as via dissociating and obtaining separated individual cells from the biological sample, the cartridge comprising: (a) a sample processing unit comprising: a sealable port configured to receive the biological sample for introduction to the sample processing unit; a sample chamber configured to collect the biological sample; and a mincer, wherein the mincer is configured to interface with the sample chamber; (b) a reaction unit comprising a reaction chamber configured to receive ultrasonic energy, wherein the sample processing unit and the reaction unit are connected via a first channel; (c) a filtration unit comprising: a filtration chamber; and a filtration device configured to enter the filtration chamber, wherein the reaction chamber and the filtration unit are connected via a second channel; and (d) a collection unit configured to receive the separated individual cells from the biological sample, wherein the filtration unit and the collection unit are connected via a third channel.

In some embodiments, the cartridge further comprises a first gate configured to control the fluidic connection, e.g., the material flow, between: the sample processing unit and the reaction unit via the first channel; and/or the reaction unit and the filtration unit via the second channel. In some embodiments, the gates described herein serve as a valve and may block (such as seal) a channel or allow material flow through a channel. In some embodiments, the gates described herein may provide control of the rate of material flow through a channel, such as via partial opening/blocking of the channel. In some embodiments, the first gate is configured to be positioned in a first location, wherein when the first gate is in the first position the sample processing unit and the reaction unit are fluidically connected and the reaction unit and the filtration unit are not fluidically connected. In some embodiments, the first gate is configured to be positioned in a second location, wherein when the first gate is in the second position the reaction unit and the filtration unit are fluidically connected and the sample processing unit and the reaction unit are not fluidically connected. In some embodiments, the positioning of the first gate is controlled via pivoting on an axis.

In some embodiments, the cartridge further comprises a second gate configured to control the fluidic connection between the filtration unit and the collection unit via the third channel. In some embodiments, the second gate is configured to be position in a first location, wherein when the second gate is in the first position the filtration unit and the collection unit are not fluidically connected. In some embodiments, the second gate is configured to be position in a second location, wherein when the second gate is in the second position the filtration unit and the collection unit are fluidically connected. In some embodiments, the positioning of the second gate is controlled via pivoting on an axis.

In some embodiments, the first channel, the second channel, and the third channel are positioned and configured such that material flow between the sample processing unit, the reaction unit, the filtration unit, and the collection unit is controlled by tilting of the cartridge. In some embodiments, the channel is sloped to promote material flow from one module to another module, e.g., from the sample processing unit to the reaction unit.

In some embodiments, the sealable port of the sample processing unit is configured to receive a fluid for introduction to the sample processing unit. In some embodiments, the fluid is an aqueous fluid, such as a buffer or cell media solution.

In some embodiments, the sealable port of the sample processing unit comprises a wall, wherein the wall, or a portion thereof, slopes toward the sample chamber, e.g., slopes in the direction of the bottom of the sample chamber. In some embodiments, the cartridge further comprises a cap configured to seal the sealable port of the sample processing unit. In some embodiments, the sealable port has a circular shape and the cap is circular. In some embodiments, the cap is configured to be removed and replaced.

In some embodiments, the sample chamber is configured such that the biological sample and added material will concentrate in a pre-determined location of the sample chamber. In some embodiments, the sample chamber comprises one or more centrally sloping walls. In some embodiments, the sample chamber comprises two centrally sloping walls. In some embodiments, the sample chamber comprises a portion of a conical shape having a substantially flat bottom portion. In some embodiments, the sample chamber comprises a substantially flat bottom portion.

In some embodiments, the sample processing unit comprises a guide configured to position the mincer. In some embodiments, the guide enables the mincer to slide up and down, e.g., to repetitively enter the sample chamber. In some embodiments, the sample processing unit is configured to control the degree to which the mincer can slide, e.g., depth and/or height. In some embodiments, the mincer comprises a rod. In some embodiments, the mincer comprises a cutting surface on the end of the mincer that interfaces with the sample chamber.

In some embodiments, the reaction chamber of the reaction unit comprises a bottom surface that is acoustically conductive. In some embodiments, the bottom surface of the reaction chamber is substantially flat. In some embodiments, the reaction chamber of the reaction unit comprises a cylindrical wall. In some embodiments, the volume of the reaction chamber is configured to hold a pre-determined volume of material. In some embodiments, when material is in the reaction chamber, the volume of the reaction chamber is configured such that the top surface of the material, such as the meniscus, is at a pre-determined position or within a range of pre-determine positions. In some embodiments, the pre-determined position or range of pre-determined positions is relative to the ultrasonic transducer.

In some embodiments, the filtration device of the filtration unit comprises a tubular assembly, wherein an outer surface of the tubular assembly is configured to provide a seal with a side wall of the filtration chamber, and wherein the tubular assembly comprises a cell-filter mesh covering a bottom opening of the tubular assembly. In some embodiments, the tubular assembly comprises a cylinder shape without top and bottom flat surfaces. In some embodiments, the tubular assembly comprises one or more side holes, wherein the side holes are covered by a cell-filter mesh. In some embodiments, the side wall of the filtration chamber, or a portion thereof, is cylindrical. In some embodiments, the filtration chamber of the filtration unit comprises a bottom surface having a convex structure. In some embodiments, the filtration unit comprises a guide configured to position the tubular assembly in the filter chamber, such as via a rod that extends from the tubular assembly. In some embodiments, the guide enables the tubular assembly to slide up and down the filtration chamber. In some embodiments, the filtration device is configured to compress the biological sample, or the portion thereof, in the filtration chamber, such as to expel separated cells therefrom. In some embodiments, the filtration unit is configured to control the degree to which the tubular assembly can slide, e.g., depth and/or height. In some embodiments, the filtration unit comprises a vent. In some embodiments, the vent is configured to allow the inflow and outflow of air into the filtration unit, such as when the tubular assembly is moved up and down in the filtration chamber. In some embodiments, the vent is configured to block the flow of fluid from leaving the filtration unit.

In some embodiments, the cell-filter mesh is configured to filter particles, such as cells, within an aqueous solution based on particle size. In some embodiments, the cell-filter mesh allows certain particles, such as separated individual cells, to pass through the cell-filter mesh while stopping larger particles, such as clumps of cells and/or the extracellular matrix, from passing through the cell-filter mesh. In some embodiments, the cell-filter mesh has a mesh size (e.g., a pore size) of about 40 µm to about 125 µm, such as about 60 µm to about 100 µm, about 60 µm to about 80 µm, or about 65 µm to about 75 µm. In some embodiments, the cell-filter mesh has a mesh size of less than about 125 µm, such as less than about any of 120 µm, 115 µm, 110 µm, 105 µm, 100 µm, 95 µm, 90 µm, 85 µm, 80 µm, 75 µm, 70 µm, 65 µm, 60 µm, 55 µm, 50 µm, 45 µm, or 40 µm. In some embodiments, the cell-filter mesh has a mesh size of greater than about 40 µm, such as great than about any of 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, or 125 µm. In some embodiments, the cell-filter mesh has a mesh size of about any of 40 µm, 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, or 125 µm. In some embodiments, the cell-filter mesh has an average mesh size of about any of 40 µm, 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, or 125 µm. In some embodiments, the cell-filter mesh comprises a PEEK mesh, a polyester mesh, a nylon mesh, a polypropylene mesh, a glass fiber mesh, or a stainless steel mesh.

In some embodiments, the collection unit is configured to receive and hold a removable collection device for receiving separated cells from the biological sample. In some embodiments, the removable collection device is an Eppendorf tube.

In some embodiments, the cartridge is configured to be loadable into an ultrasonic processing device. In some embodiments, certain features of the cartridge are configured to be attached, such as functionally attached, to the ultrasonic processing device. For example, in some embodiments, the mincer of the sample processing unit is configured to engage with a mincer actuator, such as via a clip, of the ultrasonic processing device. In some embodiments, the rod of filter device of the filtration unit is configured to engage with a filter actuator, such as via a clip, of the ultrasonic processing device.

In some embodiments, the cartridge comprises one or more materials, wherein the one or more materials are compatible with the biological sample and any added material, such as a buffer, and are compatible with the forces and temperatures applied thereto.

In some embodiments, the biological sample comprises a plurality of cells. In some embodiments, the biological sample comprises a plurality of cells, wherein at least a portion of the cells are interconnected such as via an extracellular matrix. In some embodiments, the biological sample is a solid tissue sample. In some embodiments, the biological sample is a sample from a vertebrate or invertebrate. For example, the biological sample may be sourced from the group consisting of a mammalian, reptilian, avian, fish, insect, or nematode sample. In some embodiments, the biological sample is sourced from a human. In some embodiments, the biological sample is a plant sample, such as a plant tissue. In some embodiments, the biological sample contains eukaryotic cells. In some embodiments, the biological sample contains multicellular prokaryotes (e.g., a biofilm). In some embodiments, the biological sample is a cancer sample, such as a tumor tissue or a biopsy. In some embodiments, the biological sample is a healthy biological sample, such as healthy non-diseased tissue. In some embodiments, the biological sample is selected from the group consisting of a lung, kidney, liver, pancreas, stomach, brain, skin, intestine, muscle, breast, splenic, bladder, uterine, ovarian, prostate, cardiac, and bone marrow sample.

In some aspects, provided herein is an ultrasonic processing device comprising: (a) an ultrasonic transducer; (b) a temperature-controlled water bath; (c) a tilting assembly, wherein the tilting assembly is configured to hold a cartridge described herein such that (i) a reaction chamber of the cartridge is positioned relative to the ultrasonic transducer, and (ii) the reaction chamber, a sample chamber, and a filtration chamber of the cartridge, or portions thereof, are positioned relative to a water level of the temperature-controlled water bath, the tilting assembly comprising: a tilting actuator; a mincer actuator; and a filter actuator; and (d) a control unit.

In some embodiments, the ultrasonic processing device further comprises one or more gate actuators each configured to interface with a gate of the cartridge, such as the first gate or the second gate.

In some embodiments, the actuator, such as the tilting actuator, the mincer actuator, the filter actuator, or the gate actuator, comprises a stepper motor or servo motor.

In some embodiments, the tilting assembly is configured to hold the cartridge such that when a removable collection device is placed in a collection unit of the cartridge, the removable collection device, or a portion thereof, is positioned relative to the water level of the temperature-controlled water bath. In some embodiments, the reaction chamber, the sample chamber, and the filtration chamber, and the removable collection device, or portions thereof, are below the water level of the temperature-controlled water bath. For example, in some embodiments, the reaction chamber, the sample chamber, and the filtration chamber, and the removable collection device, or portions thereof, are below the water level of the temperature-controlled water bath such that when a biological sample, or portion thereof are present in the cartridge, the biological sample is maintained at a desired temperature or temperature range.

In some embodiments, the ultrasonic transducer is positioned below the temperature-controlled water bath. In some embodiments, the temperature-controlled water bath is configured to maintain a fluid, such as water, at a pre-determined temperature or range thereof. In some embodiments, the pre-determined temperature, or range thereof, is configured such that the biological sample is maintained below a pre-determined temperature for the duration of the method of dissociating and obtaining separated individual cells from the biological sample. In some embodiments, the pre-determined temperature, or range thereof, is configured such that the biological sample is maintained below about 20° C., such as below about any of 15° C., 10° C., 9° C., 8° C., 7° C., 6° C., 5° C., 4° C., 3° C., 2° C., or 1° C. In some embodiments, the pre-determined temperature, or range thereof, is about 4° C. to about 20° C., such as about 4° C. to about 15° C., 4° C. to about 10° C., or 4° C. to about 8° C. In some embodiments, the temperature-controlled water bath is configured to hold a fluid, such as water such that the fluid serves as a coupling media from the transducer to the sample.

In some embodiments, the mincer actuator comprises a feature, such as a clip, to interface with a mincer of the cartridge.

In some embodiments, the filter actuator comprises a feature, such as a clip, to interface with a filtration device of the cartridge.

In some embodiments, the control unit comprises: one or more processors; and a memory storing one or more programs, the one or more programs configured to be executed by the one or more processors, the one or more programs including instructions for executing a method for dissociating and obtaining separated individual cells from a biological sample. In some embodiments, the instructions for executing the method for dissociation and obtaining separated individual cells from the biological sample comprise instructions for any one or more of: operating the ultrasonic transducer; operating the tilting actuator; operating the mincer actuator; operating the filter actuator; operating one or more gate actuators; and operating the temperature-controlled water bath. In some embodiments, the instructions for operating the ultrasonic transducer comprise instructions for controlling the duration and intensity of the ultrasonic transducer. In some embodiments, the instructions for operating the tilting actuator comprise instructions for controlling the positioning and movement of the cartridge, such as the degree of tilting, the speed of movement, and the duration the cartridge is in a certain position. In some embodiments, the instructions for operating the mincer actuator comprise instructions for controlling the positioning of the miner, the speed of the mincer, the depth the mincer penetrates the sample chamber, and the number of times the mincer penetrates the sample chamber. In some embodiments, the instructions for operating the filter actuator comprise instructions for controlling the positioning of the filter device, speed of the filter device, the depth the filter device penetrates the filter chamber, and the number of times the filter device penetrates the filter chamber. In some embodiments, the instructions for operating one or more gate actuators comprise instructions for controlling the positioning of a gate, the opening and closing of the gate, and the degree to which the gate blocks a channel. In some embodiments, the instructions for operating the temperature-controlled water bath comprise instructions for controlling the temperature and level of water in the temperature-controlled water bath.

In some embodiments, the ultrasonic processing device comprises a user interface. In some embodiments, the user interface comprises a screen with information regarding the system and a method of processing a biological system. In some embodiments, the user interface comprises a feature, such a buttons or a keyboard, for inputting information into the ultrasonic processing device. In some embodiments, the user interface communicates a status to the user, such as a status indicating the need to add additional material to the cartridge or that the method has been completed.

In some aspects, provided herein is a method for obtaining separated individual cells from a biological sample, the method comprising: loading a cartridge described herein into an ultrasonic processing device described herein; loading a biological sample into a sample processing unit of the cartridge via a sealable port; and commencing a programmed method of the ultrasonic processing device to dissociate and obtain separated individual cells from the biological sample. In some embodiments, the method further comprises adding additional material, such as a buffer, to the cartridge via the sealable port. In some embodiments, the method further comprises sealing the sealable port with a cap.

FIG. 1 illustrates a cross-sectional view of a system 100 for processing a solid biological tissue sample 140 in a cartridge apparatus 102, according to some embodiments. System 100 includes an ultrasonic processing device 120 (also referred to as processing device) having an opening 120A for receiving cartridge apparatus 102, according to some embodiments. In some embodiments, cartridge apparatus 102 is configured to be handheld to enable ease of use. For example, cartridge apparatus 102 may have a width within 100 mm, 85 mm, 70 mm, or 55 mm to enable cartridge apparatus 102 to be held in one hand.

As shown in FIG. 1, housing unit 102A of cartridge apparatus 102 is configured to be placeable within opening 120A of processing device 120. In some embodiments, cartridge apparatus 102 includes a bottom surface 102B that is a datum surface with respect to transducer assembly 130 of ultrasonic processing device 120. In some embodiments, cartridge apparatus 102 is configured to be insertable into opening 120A until bottom surface 102B is a predetermined distance from transducer assembly 130. For example, the predetermined distance may be less than 10 mm, 8.5 mm, 7 mm, or 5.5 mm. In some embodiments, this predetermined distance is maintained when cartridge apparatus 102 is loaded into ultrasonic processing device 120 because varying this distance may change how ultrasonic energy generated by ultrasonic processing device 120 dissociates solid tissue sample 140.

In some embodiments, cartridge apparatus 102 can include a loading chamber 104 and a collection chamber 106. In some embodiments, loading chamber 104 can have a top opening (e.g., a round top opening), a bottom surface 104B (e.g., a circular surface), and an interior surface (e.g., a tubular surface). In some embodiments, the top opening of loading chamber 104 can serve as an inlet 104A for receiving solid tissue sample. In some embodiments, solid tissue sample 140 is an animal tissue, and may be, for example vertebrate or invertebrate tissue. For example, the tissue may be, but is not limited to, mammalian, reptilian, avian, fish, insect, or nematode tissue. In some embodiments, the tissue is a plant tissue. In some embodiments, the tissue contains eukaryotic cells. In some embodiments, the cells are multicellular prokaryotes (e.g., a biofilm). In some embodiments, the tissue is a tumor tissue or a cancer tissue, or a biopsy sample. Biological tissue sample 140 may be, for example, a lung, kidney, liver, pancreas, stomach, brain, skin, intestine, muscle, breast, splenic, bladder, uterine, ovarian, prostate, cardiac, bone marrow, or any other solid tissue, which may be a diseased tissue or a healthy tissue, such as cancerous tissue or non-cancerous tissue.

In some embodiments, inlet 104A can also receive an aqueous fluid 142 to hold solid tissue sample 140. In some embodiments, aqueous fluid 142 includes culture medium (also referred to as cell culture medium or growth medium), which is a liquid or gel of selected components to support and maintain cells such as dissociated cells of solid tissue sample 140. In some embodiments, the culture medium can include artificial media such as balanced salt solutions, basal media, or complex media. For example, a commonly used basal media includes Minimum Essential Medium (MEM) or Dulbecco's Modified Eagle Medium (DMEM). For example, complex media may include Roswell Park Memorial Institute (RPMI) 1640 or Iscove's Modified Dulbecco's Medium (IMDM). In some embodiments, inlet 104A of loading chamber can be sealed after solid tissue sample 140 is inserted to enable cartridge apparatus 102 to process solid tissue sample 140 without exposing solid tissue sample 140 to the outside environment. For example, cartridge apparatus 102 may include a lid (e.g., a snap cap, a screw-on cap, etc.) coupleable to inlet 104A. After the user inserts solid tissue sample 140, the lid can be pressed and coupled to inlet 104A to provide a tight seal.

In some embodiments, loading chamber 104 includes bottom surface 104B for acoustically coupling aqueous fluid 142 and solid tissue sample 140 to ultrasonic processing device 120. By providing bottom surface 104B that is acoustically conductive, loading chamber 104 is configured to enable ultrasonic energy generated by processing device 120 to dissociate single cells from biological tissue sample 140 to result in an aqueous suspension. In some embodiments, bottom surface 104B may include an acoustically conductive layer such as a plastic layer, a glass layer, or a ceramic layer. In some embodiments, the acoustically conductive layer may be a film (e.g., a plastic film) that make up bottom surface 104B. In some embodiments, bottom surface 104B is a flat layer that enables more even and close coupling to transducer assembly 130 of cartridge apparatus 102, as will be further described below.

In some embodiments, collection chamber 106 can receive cells dissociated from solid tissue sample 140, as will be further described below with respect to FIG. 2. In some embodiments, collection chamber 106 can include a removable container (e.g., a test tube or plastic container) that can be detached from cartridge apparatus 102 to enable its contents to be further processed in downstream analytics. For example, the contents of collection chamber 106 can be processed in a primary cell culture, single-cell fluorescence activated cell sorting (FACS) analysis, single-cell DNA and RNA analysis, or single-cell sequencing. In some embodiments, collection chamber 106 comprises a lid 108 (e.g., a snap cap, a screw-on cap, etc.) to seal contents in collection chamber 106 from the external environment.

In some embodiments, cartridge apparatus 102 can include other chambers such as a fluid source chamber 110 (also referred to as reagent chamber or media chamber) or one or more filtration chambers 112 and 114. In some embodiments, fluid source chamber 110 can include an inlet 110A for receiving and holding an aqueous fluid (e.g., aqueous fluid 142 or another fluid) from outside of cartridge apparatus 102. In some embodiments, cartridge apparatus 102 includes a channel that fluidly connects fluid source chamber 110 to loading chamber 104 to enable the aqueous fluid to flow from fluid source chamber 110 to loading chamber 104. In some embodiments, cartridge apparatus 102 includes a plurality of channels that fluidly couple loading chamber 104 to collection chamber 106 through filtration chambers 112 and 114. In some embodiments, filtration chambers 112 and 114 can be configured to selectively capture effluent materials from an aqueous suspension flowing through the plurality of channels.

As will be further described below, once solid tissue sample 140 is loaded with aqueous fluid 142 in loading chamber 104, solid tissue sample 140 remains contained within cartridge apparatus 102 during processing until target components such as dissociated cells from solid tissue sample 140 are received at collection chamber 106. Therefore, in contrast to conventional methods that requires solid tissue samples and associated aqueous suspensions to be transferred between different containers during processing and therefore exposes the solid tissue sample to the external environment, cartridge apparatus 102 provides a sealed, self-contained environment.

In some embodiments, ultrasonic processing device 120 includes a power supply 132 supplying power to various components to enable single cells to be dissociated from solid tissue sample 140 and subsequently collected in collection chamber 106. As shown in FIG. 1, ultrasonic processing device 120 includes at least one transducer assembly 130 configured to be in alignment with a reaction chamber of cartridge apparatus 102 when housing unit 102A of cartridge apparatus 102 is loaded within opening 120A of ultrasonic processing device 120. In some embodiments, processing of solid tissue sample 140 can occur in loading chamber 104. In these embodiments, loading chamber 104 is also the reaction chamber.

In some embodiments, transducer assembly 130 can include a transducer and an acoustic wave directing device. For example, the acoustic wave directing device may be a spherical lens (e.g., a Fresnel lens) fabricated on a transducer plate of the transducer assembly to concentrate the ultrasonic waves in loading chamber 104. Various embodiments of transducer assembly 130 are described in U.S. Patent Application No. 2013/0199298A1 and U.S. Pat. Nos. 6,682,214 and 8,319,398, the entire contents of each is incorporated by reference herein in their entireties.

In some embodiments, ultrasonic processing device 120 includes a control processor 124 configured to control operations of ultrasonic processing device 120. For example, control processor 124 may operate transducer assembly 130 to generate and direct bulk ultrasonic energy towards the reaction chamber holding solid tissue sample 140. In some embodiments, to generate the bulk ultrasonic energy, transducer assembly 130 is configured to emit ultrasonic waves that have a high lateral acoustic potential profile directed in a target direction, which allows for mixing of fluids (e.g., aqueous fluid 142 holding solid biological tissue sample 140) within the target direction. In some embodiments, control processor 124 is configured to control radio frequency (RF) generator 126 and RF amplifier 128 to drive transducer assembly 130.

In some embodiments, the bulk ultrasonic waves generated by transducer assembly 130 apply a mixing and suspending force in aqueous fluid 142 held in loading chamber 104 to dissociate single cells from solid tissue sample 140. In contrast to conventional cell dissociation methods, ultrasonic energy and not enzymes are used. Therefore, much faster processing times can be achieved in addition to maintaining the gene expression profile of cells dissociated from solid tissue sample 140.

In some embodiments, ultrasonic processing device 120 can include one or more additional transducer assemblies (similar to transducer assembly 130) configured to align with one or more corresponding filtration chambers 112 and 114 when cartridge apparatus 102 is loaded in opening 120A of ultrasonic processing device 120. In some embodiments, the ultrasonic energy generated by these transducer assemblies can be directed at the aqueous solution flowing through filtration chambers 112 and 114 to enable positive and negative filtration, as will be further described below.

In some embodiments, control processor 124 can be connected to an input device 122 that enables a user to interact with and control ultrasonic processing device 120. In some embodiments, input device 122 includes a control panel or a touch screen for receiving user input. For example, an input specified by the user may include a specific amount of time to activate transducer assembly 130 to dissociate cells from solid tissue sample 140. In some embodiments, input device 122 can be any suitable device that provides input, such as a touch screen, keyboard or keypad, mouse, or voice-recognition device. In some embodiments, ultrasonic processing device 120 includes an output device 136, which can be any suitable device that provides output, such as a touch screen, haptics device, or speaker.

In some embodiments, ultrasonic processing device 120 includes an actuating device 134 that connects to one or more channels in cartridge apparatus 102. In some embodiments, cartridge apparatus 102 can include one or more connecting components coupled to the one or more channels and configured to physically connect cartridge apparatus 102 with actuating device 134. For example, a connecting component may include a fitting or an adaptor.

In some embodiments, control processor 124 can be configured to operate actuating device 134 to control a flow of an aqueous solution, resulting from ultrasonic processing, from loading chamber 104 through one or more filtration chambers 112 and 114 to collection chamber 106. For example, actuating device 134 may include a vacuum pump that connects to cartridge apparatus 102 via the one or more connecting components and force the aqueous solution through the one or more filtration chambers 112 and 114. In some embodiments, the pump may include a positive displacement pump such as a diaphragm pump, a piston pump, a peristaltic pump, or a valveless pump.

In some embodiments, the one or more channels of cartridge that connect loading chamber 102 to collection chamber 106 can include a plunger device, as will be further described below with respect to FIG. 2. In these embodiments, cartridge apparatus 102, the plunger device may include a connector component (e.g., a latch, a handle, etc.) configured to connect to actuating device 134. In these embodiments, actuating device 134 may include a motor apparatus configured to drive a pulling and/or pushing force to operate the plunger device.

Figure 2:
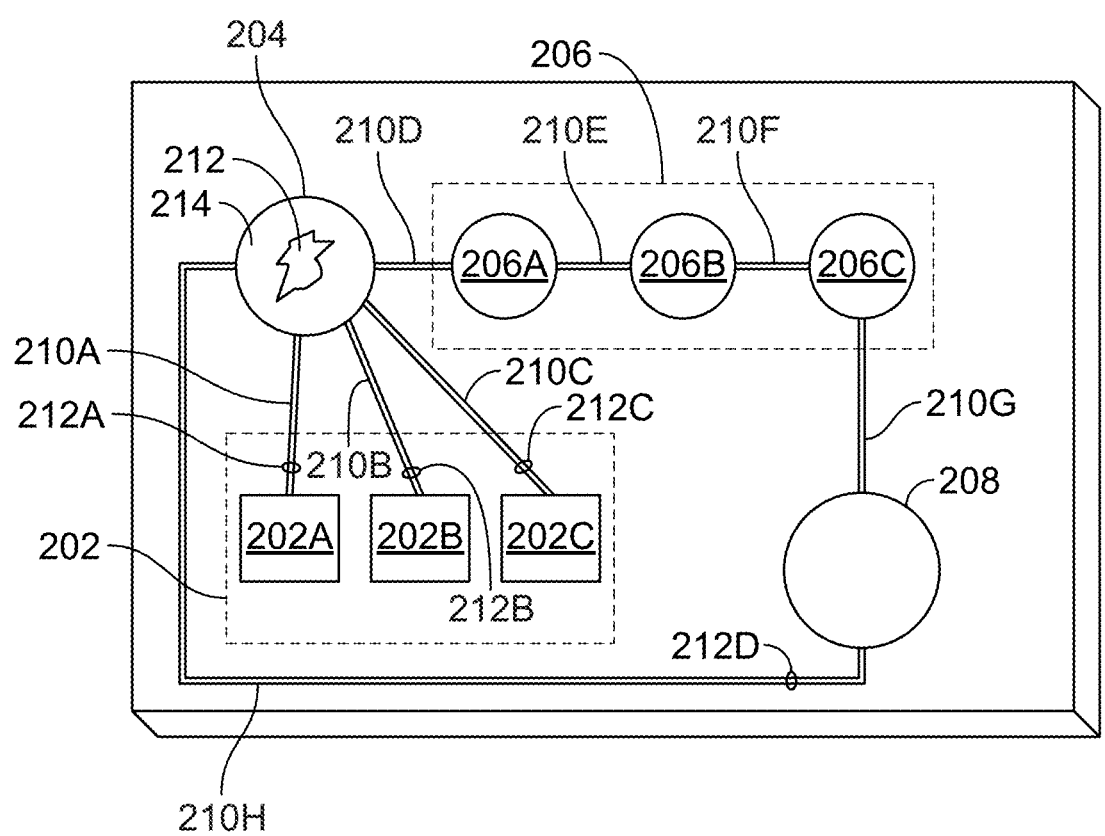
FIG. 2 illustrates a diagram of a cartridge apparatus for processing a solid biological tissue sample, according to some embodiments.

FIG. 2 illustrates a diagram of a cartridge apparatus 200 for processing a solid biological tissue sample 212, according to some embodiments. Cartridge apparatus 200 may be an example implementation of cartridge apparatus 102 of FIG. 1. In some embodiments, cartridge apparatus 200 can include one or more fluid source chambers 202 (also referred to as reagent chambers or media chambers), a loading chamber 204, one or more filtration chambers 206, and a collection chamber 208. In some embodiments, cartridge apparatus 200 can be configured to include fluidic channels 210A-H that fluidly couple two or more of chambers 202-208, as will be further described below. In some embodiments, one or more of fluidic channels may include a tube or an etched or molded channel within cartridge apparatus 102.

In some embodiments, fluid source chambers 202 can correspond to fluid source chamber 110 of FIG. 1 and be configured to receive and store reservoirs of an aqueous fluid 214 to hold single cells dissociated from solid biological tissue sample 212. For example, fluid source chambers 202 may include three fluid source chambers 202A-C having respective inlets for receiving the same or different aqueous fluids. In some embodiments, cartridge apparatus 200 can include fluidic channels 210A-C to fluidly connect respective fluid source chambers 202A-C to sample loading chamber 204. In some embodiments, once cartridge apparatus 200 is loaded within an ultrasonic processing device such as ultrasonic processing device 120 of FIG. 1, flow of aqueous fluids from one or more fluid source chambers 202A-C can be controlled by actuating device 134 to flow towards loading chamber 204. In some embodiments, channels 210A-C include respective valves 212A-C that can be controlled by actuating device 134 to control which of aqueous fluids (e.g., reagents) from fluid source chambers 202A-C and in which amounts can flow towards loading chamber 204. For example, one of valves 212A-C may include a gate valve that can be opened or fully closed by actuating device 134 to select aqueous fluid from one or more of respective fluid source chambers 202A-C. In another example, one of valves 212A-C may include a globe valve to control flow of an aqueous fluid to loading chamber 204.

In some embodiments, loading chamber 204 can include an inlet for receiving solid biological tissue sample 212. In some embodiments, loading chamber 204 can be configured to receive aqueous fluid 214 from the inlet or from one or more of fluid source chambers 202. In some embodiments, loading chamber 204 is configured to be positioned such that when cartridge apparatus 200 is loaded into ultrasonic processing device 120, loading chamber 204 is aligned with transducer assembly 130 of ultrasonic processing device 120. In some embodiments, loading chamber 204 can be configured to hold solid biological tissue sample 212 during a mincing operation and/or during ultrasonic dissociation of cells from solid tissue sample 212. For example, when loading chamber 204 is positioned over transducer assembly 130, single cells from biological tissue sample 212 can be dissociated by the bulk lateral ultrasonic energy generated by transducer assembly 130. In some embodiments, prior to activating ultrasonic processing device 120 to perform ultrasonic cell dissociation, loading chamber 204 can be sealed from the external environment. In some embodiments, minced biological tissue sample 212 can be transported to a separate, reaction chamber, where cells are dissociated from minced biological tissue sample 212.

In some embodiments, after completion of ultrasonic dissociation, loading chamber 204 contains an aqueous suspension that includes a mixture of the original aqueous fluid 214, targeted components dissociated from solid tissue sample 212, and effluent materials dissociated from solid tissue sample 212. For example, a targeted component may include dissociated cells of interest. For example, effluent materials may include non-targeted components dissociated from tissue sample 212 such as cellular debris and extracellular debris.

In some embodiments, cartridge apparatus 200 includes one or more filtration chambers 206A-C that selectively filters effluent materials from the aqueous solution as the aqueous solution flows from loading chamber 204 to collection chamber 208. In some embodiments, filtration chambers 206A-C include a series of two or more filtration chambers 205A-C that connects loading chamber 204 to collection chamber 208. In some embodiments, filtration chambers 206 can include a positive filtration chamber, in which analytes of interest are captured within the filtration chamber, or include a negative filtration chamber, in which analytes of interest passes through the filtration chamber. In some embodiments, a filtration chamber (e.g., one of filtration chambers 206A-C) can include a filter configured to filter particles within the aqueous solution based on size (e.g., mesh or membrane pore sizes). For example, the filter may be a mesh filter that captures extracellular matrix of sample tissue 212 and allowing smaller particles within the aqueous solution to pass through a 70 um mesh.

In some embodiments, a filtration chamber (e.g., one of filtration chambers 206A-C) can include markers (e.g., antibodies on beads or microbubbles) configured to bind to cell types within the aqueous solution. In positive filtration, these cell types may include analytes of interest, where in negative filtration, these cell types may include effluent materials (e.g., non-targeted components). In some embodiments, filtration chamber can include a filter (e.g., a mesh filter) that prevents the marker from passing to a subsequent chamber. In some embodiments, in addition to or instead of using the filter, ultrasonic processing device 120 can include one or more magnets that exerts a pulling force on the marker to prevent its passage through subsequent chambers.

In some embodiments, cartridge apparatus 200 includes a channel 210D configured to fluidly couple loading chamber 204 to one or more of filtration chambers 206A-C. In some embodiments, cartridge apparatus 200 includes a plurality of channels 210E-G that fluidly connects successive chambers of filtration chambers 206A-C to enable the aqueous suspension to flow from loading chamber 204 to collection chamber 208. In some embodiments, one or more of channels 210D-G can include one or more respective valves (e.g., a gate valve or a globe valve) operated by actuating device 134 to control the flow of the aqueous solution.

In some embodiments, one or more of filtration chambers 206A-C can be positioned to be in alignment with one or more corresponding transducer assemblies of ultrasonic processing device 120 when cartridge apparatus 200 is loaded within ultrasonic processing device 120. These transducer assemblies may be separate from transducer assembly 130. In some embodiments, the bottom surfaces of the one or more filtration chambers 206A-C is configured to acoustically coupled to one or more corresponding transducer assemblies to receive bulk ultrasonic energy to promote selective flow of the targeted components. In some embodiments, a filtration chamber positioned over a transducer assembly (separate from transducer assembly 130) can achieve higher filtration efficiency. For example, the ultrasonic energy (e.g., bulk lateral ultrasonic energy) applied by the transducer assembly may apply a mixing force on the contents (i.e., marker and aqueous solution) in the filtration chamber to increase binding likelihood.

In some embodiments, when cartridge apparatus 200 is loaded within the ultrasonic processing device 120, an actuating device 134 of the ultrasonic processing device 120 can control the flow of the aqueous suspension including the dissociated cells through fluidic channels 210D-210G. For example, as discussed above with respect to FIG. 1, actuating device 134 may include a pump or a mechanical motor.

In some embodiments, collection chamber 208 can be configured to receive and collect target components of interest from the dissociated cells of solid biological tissue sample 212 that have not been filtered by filtration chambers 206A-C. In some embodiments, collection chamber 208 is removable and can be configured to detach from cartridge apparatus 200.

In some embodiments, cartridge apparatus 200 includes channel 210H that fluidly couples collection chamber 208 to loading chamber 204. In some embodiments, channel 210H is configured as a one-way fluidic channel that allows aqueous fluid from collection chamber 208 to flow back to loading chamber 204, but prevents backflow of fluids from loading chamber 204 to collection chamber 208. For example, channel 210H may include a check valve 212D to prevent backflow of fluid into collection chamber 208. One advantage provided by channel 210H is reuse of aqueous fluid for future ultrasonic dissociation processes.

Figure 3:
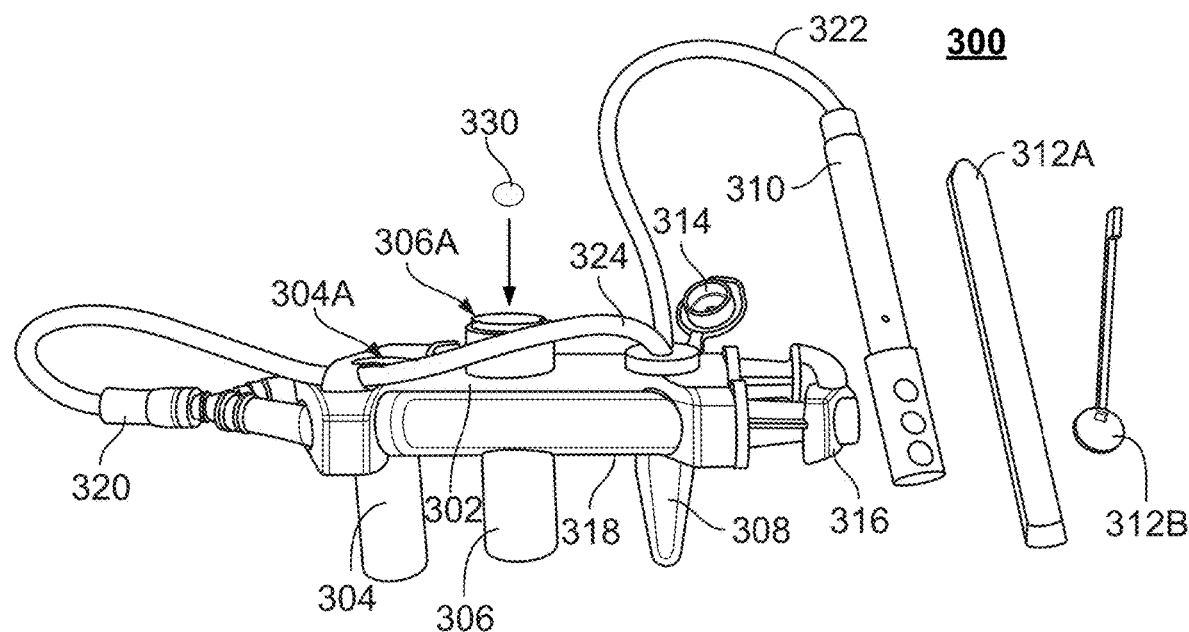
FIG. 3 illustrates a cartridge apparatus for processing a solid biological tissue sample, according to some embodiments.

FIG. 3 illustrates a cartridge apparatus 300 for processing a solid biological tissue sample 330, according to some embodiments. In some embodiments, cartridge apparatus 300 may be an example implementation of cartridge apparatus 102 of FIG. 1 or cartridge apparatus 200 of FIG. 2, and that is configured to be placeable inside opening 120A of ultrasonic processing device 120 of FIG. 1.

As shown in FIG. 3, a base body 302 of cartridge apparatus 300 includes a plurality of chambers such as loading chamber 306 and collection chamber 308. Similar to loading chamber 104 of FIG. 1, loading chamber 306 can include an inlet 306A for receiving solid biological tissue sample 330. In some embodiments, inlet 306A of loading chamber 306 can be configured to also receive an aqueous fluid to hold solid tissue sample 330. For example, as described above with respect to FIG. 1, the aqueous fluid may be a cell culture medium such as MEM or DMEM. In some embodiments, cartridge apparatus 300 can include one or more fluid source chambers, with respective inlets for receiving one or more aqueous fluids and controlling flow of one or more of these aqueous fluids to loading chamber 306.

In some embodiments, loading chamber 306 is configured to allow the contained solid tissue sample 330 to be minced by mincing apparatus 312. As shown in FIG. 3, mincing apparatus 312 can include a pestle component 312A and a mortar component 312B. In some embodiments, mortar component 312B includes a handle connected to a mortar base that can be inserted into loading chamber 306 and pestle component 312A includes a pestle tip that can be inserted into loading chamber 306 to mince solid tissue sample 330 against the mortar base of inserted mortar component 312B. Therefore, mincing operation can be performed directly at cartridge apparatus 300 and does not required biological sample 330 to be minced prior to being loaded in loading chamber 306. In some embodiments, the mincing operation can be performed automatically. For example, ultrasonic processing device 120 may include one or more actuating devices (e.g., a motor, a piston, etc.) configured to mechanically operate mincing apparatus 312 when cartridge apparatus 300 is loaded into ultrasonic processing device 120.

In some embodiments, cartridge apparatus 300 can be loaded into ultrasonic processing device 120 of FIG. 1 before or after solid tissue sample 330 is minced. As described above with respect to FIG. 1, loading chamber 306 can be positioned to align with transducer assembly 130 when cartridge apparatus 300 is loaded into ultrasonic processing device 120. In some embodiments, minced sample tissue 330 contained in loading chamber can be dissociated into single cells by bulk ultrasonic energy generated by ultrasonic processing device 120. In some embodiments, the resulting fluid contained in loading chamber 306 is referred to as aqueous suspension that includes the aqueous fluid, portions of solid tissue sample 330, ultrasonically dissociated cells of solid tissue sample 330, and effluent materials. For example, the effluent materials may include cellular debris or extracellular debris generated from the mincing and ultrasonic dissociation.

In some embodiments, base body 302 of cartridge apparatus 300 includes an isolated compartment 304 having an opening 304A to receive and hold filter apparatus 310 in place. In some embodiments, after solid tissue sample 330 has been minced by mincing apparatus 312 and ultrasonically dissociated by ultrasonic processing device 120, the resulting aqueous suspension in loading chamber 306 can be filtered by filter apparatus 310. For example, filter apparatus 310 can be inserted into loading apparatus 306 to compress a remaining portion of solid tissue sample 330 to expel additional cells dissociated from solid tissue sample 330, as will be further described below with respect to FIG. 4. In some embodiments, filter apparatus 310 is configured to be engaged in a slip fit with loading apparatus 306 such that a small gap exists between the exterior surface of filter apparatus 310 and the interior wall of loading apparatus 306. Accordingly, mincing and filtering processes can be performed on solid tissue sample 330 without the need to transfer solid tissue sample 330 from cartridge apparatus 202 to other devices, which increases the risk of environmental contamination. In some embodiments, the filtering operation can be performed automatically. For example, ultrasonic processing device 120 may include one or more actuating devices (e.g., a motor, a piston, etc.) configured to mechanically operate filter apparatus 310 when cartridge apparatus 300 is loaded into ultrasonic processing device 120. For example, In some embodiments, cartridge apparatus 300 includes a collection chamber 308 configured to receive and collect dissociated cells of interest from the aqueous suspension held in loading chamber 306. In some embodiments, collection chamber 308 can be a container that is detachable from cartridge apparatus 300. Prior to detaching collection chamber 308, a cap 314 can seal an inlet of collection chamber 308 to prevent collected, targeted components of interest from leaking or contacting the external environment.

In some embodiments, cartridge apparatus 300 can include one or more channels configured to fluidly connect the plurality of chambers. For example, fluidic channel 320 may be a plastic tube that fluidly connects loading chamber 306 to collection chamber 308 when filter apparatus 322 is inserted into loading chamber 306. In some embodiments, aqueous solution contained in the loading chamber 306 may be aspirated through channel 322 to collection chamber 308. In some embodiments, cartridge apparatus 300 includes a lid 324 configured to fluidly connect channel 322 and channel 320 and that can be coupled to collection chamber 308. In some embodiments, channel 320 can be coupled to one or more barrels 318 of a plunger device 316 that can be actuated to cause the aqueous solution to flow from loading chamber 306 to collection chamber through channel 322. For example, plunger device 316 can be actuated by a pulling force on a handle to cause air to be sucked from channel 322 into collection chamber 308 and through channel 320 towards barrel 318, which thereby causes the aqueous solution to follow through channel 322 into collection chamber 308.

In some embodiments, plunger device 316 may be pulled or pushed by a user. In other embodiments, plunger device 316 can be mechanically actuated by ultrasonic processing device 120 when cartridge apparatus 300 is loaded into ultrasonic processing device 120. For example, ultrasonic processing device 120 may include an actuating device (e.g., a motor that drives a pulley, a chain, or a cable, or a hydraulic pulling device) configured to exert a pulling force on plunger device. In some embodiments, the actuating device may include a vacuum pump, as described in FIG. 1, that induces a change in pressure within channel 322 to control flow of the aqueous solution from loading chamber 306 to collection chamber 308.

Figure 4:
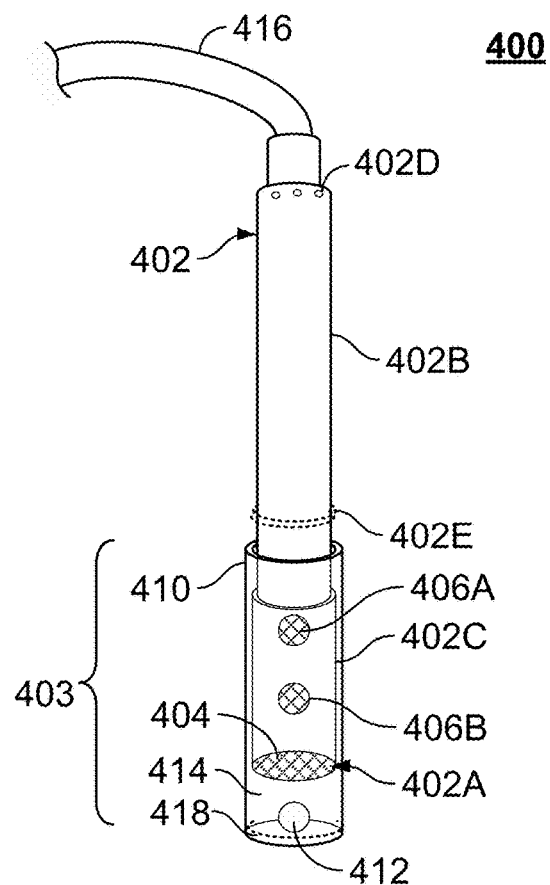
FIG. 4 illustrates a system for enhanced dissociation of cells from a solid biological tissue sample, according to some embodiments.

FIG. 4 illustrates a system 400 for enhanced dissociation of cells from a solid biological tissue sample 412, according to some embodiments. In some embodiments, system 400 includes a filter device 402 that can be operated to increase recovery of viable cells dissociated from tissue sample 412 as compared to conventional cell sieves.

In conventional filtering techniques, an aqueous suspension including cells dissociated from a solid tissue sample is poured over a cell strainer to obtain viable cells. Often, however, residual viable cells are caught in the cell strainer itself and not obtained. This may be caused by dissociated viable cells that are physically located within the fibrous mesh of a cellular matrix of the solid tissue sample. Other conventional filtering techniques require that aqueous suspension to be transferred to a separate centrifuge device to filter cells, which also leaves in the centrifuge residual tissue containing viable cells.

In some embodiments, to improve upon prior filtering techniques, filter device 402 includes a tubular body 402B that can be telescopically inserted into container 410 containing solid biological tissue sample 412 in an aqueous fluid 414. Accordingly, the circumference of tubular body 402B is slightly smaller than that of container 410 to enable insertion of filter device 402 into container 410. As described above with respect to FIGS. 1-3, aqueous fluid 414 may be a cell culture media such as MEM or RPMI 1640.

In some embodiments, filter device 402 can be composed of a material compatible with solid biological tissue sample 412. For example, tubular body 402B of filter device 402 may be made of a plastic (e.g., polystyrene) that does not react with biological tissues. In some embodiments, tubular body 402B is configured to be rigid to engage in a slip fit with container 410 when filter device 402 is inserted into container 410 such that a tight seal is not formed. During insertion, the slip fit results in a gap between the exterior surface of tubular body 402B and the interior surface of container 402 to allow for filter device 402 to be readily inserted and withdrawn from container 410 to iteratively compress solid biological tissue sample 412 to expel dissociated cells, as will be further discussed below. In some embodiments, to reduce the pressure induced within the upper portion of tubular body 402B when inserted into container 410, filter device 402 can be configured to include one or more holes along the upper portion. For example, tubular body 402B may include one or more holes 402D positioned in the upper portion of tubular body 402B. In some embodiments, holes 402D may be positioned on a top surface of filter device 402. In some embodiments, holes 402D may have a diameter between 0.5 mm-3 mm, between 1-2.5 mm, or between 1-2 mm.

In some embodiments, filter device 402 includes a cell-filter mesh 404 covering a bottom opening 402A of tubular body 402B. In some embodiments, cell-filter mesh 404 can include a PEEK mesh, a polyester mesh, a nylon mesh, a polypropylene mesh, a glass fiber mesh, or a stainless steel mesh. In some embodiments, cell-filter mesh 404 can have a mesh size of 40 µm, 70 µm, or 100 µm.

In some embodiments, cell-filter mesh 404 is configured to compress tissue sample 412 to expel cells from an extracellular matrix of tissue sample 412 when filter device 402 is fully inserted into container 410. In some embodiments, fully insertion occurs when tubular body 402B is inserted until it reaches the bottom of container 410 and/or cannot be further inserted. In some embodiments, filter device 402 is configured to be extended into container 410 by a most predefined distance 403 that is sufficient to enable cell-filter mesh 404 to press and compress tissue sample 412. In some embodiments, the predefined distance 403 enables tissue sample 412 to be compressed by at least 50%, 60%, 70%, 80%, or 90%.

In some embodiments, tubular body 402B includes a raised portion 402E that prevents tubular body 402B from being extended further than the predefined distance 403. For example, the raised portion 402E may be a tab or a ring (as shown) attached to tubular body 402B. Raised portion 402E may be any rigid material compatible with container 410 such as a plastic, a rubber, a ceramic, etc.

In some embodiments, in addition to or alternative to raised portion 402E, container 410 includes stopper material 418 positioned at the bottom of container 410 to prevent tubular body 402E from being extended further than predefined distance 403. In some embodiments, stopper material 418 may be one or more tabs or a ring (as shown) composed of a sponge, a rubber, or a plastic material. In some embodiments, stopper material 418 may have a height of at least 0.1 mm, 0.2 mm, 0.25 mm, or 0.5 mm. In some embodiments, stopper material 418 may have a height less than 0.7 mm, 0.5 mm, 0.25 mm, or 0.2 mm.

In some embodiments, a lower portion 402C of tubular body 402B is positioned within container 410 when filter device 402 is fully inserted into the container. In some embodiments, lower portion 402C includes one or more openings covered by one or more corresponding cell-filter meshes 406A-B, which may be the same as cell-filter mesh 402A.

In some embodiments, when tissue sample 412 is compressed, an aqueous fluid is expelled from the compressed tissue sample 412 to expel dissociated cells and pass the expelled cells through cell-filter mesh 404 towards an interior, e.g., center, of tubular body 402B. Therefore, dissociated viable cells physically located within the extracellular matrix of solid tissue sample 412 can be released to increase recovery of viable cells. In some embodiments, aqueous fluid 414 also flows inside tubular body 402B through cell-filter meshes 406A-B.

In some embodiments, the aqueous fluid collected inside the tubular body 402B can be transported to a collection chamber such as collection chamber 106 of FIG. 1 or collection chamber 308 of FIG. 3. In some embodiments, filter device 402 includes a channel 416 configured to aspirate fluids, including the dispelled cells, collected inside tubular body 402B into the collection chamber. For example, channel 416 may be a plastic tube. In some embodiments, channel 416 extends along the length of and inside tubular body 402B to a position within lower portion 402C.

In some embodiments, filter device 402 can operate on solid tissue sample 412 that undergoes enzymatic dissociation. As explained above in the background, however, the use of enzymes requires lengthy incubation and processing times and may alter a gene profile expression of dissociated cells. Accordingly, in some embodiments, it may be more effectively to operate filter device 402 on solid tissue sample 412 that undergoes ultrasonic dissociation, as described above with respect to FIGS. 1-3. In these embodiments, container 410 may correspond to a reaction chamber or a loading chamber (e.g., loading chamber 306) of a cartridge apparatus such as cartridge apparatus 102 of FIG. 1 or cartridge apparatus 300.

Figure 5:
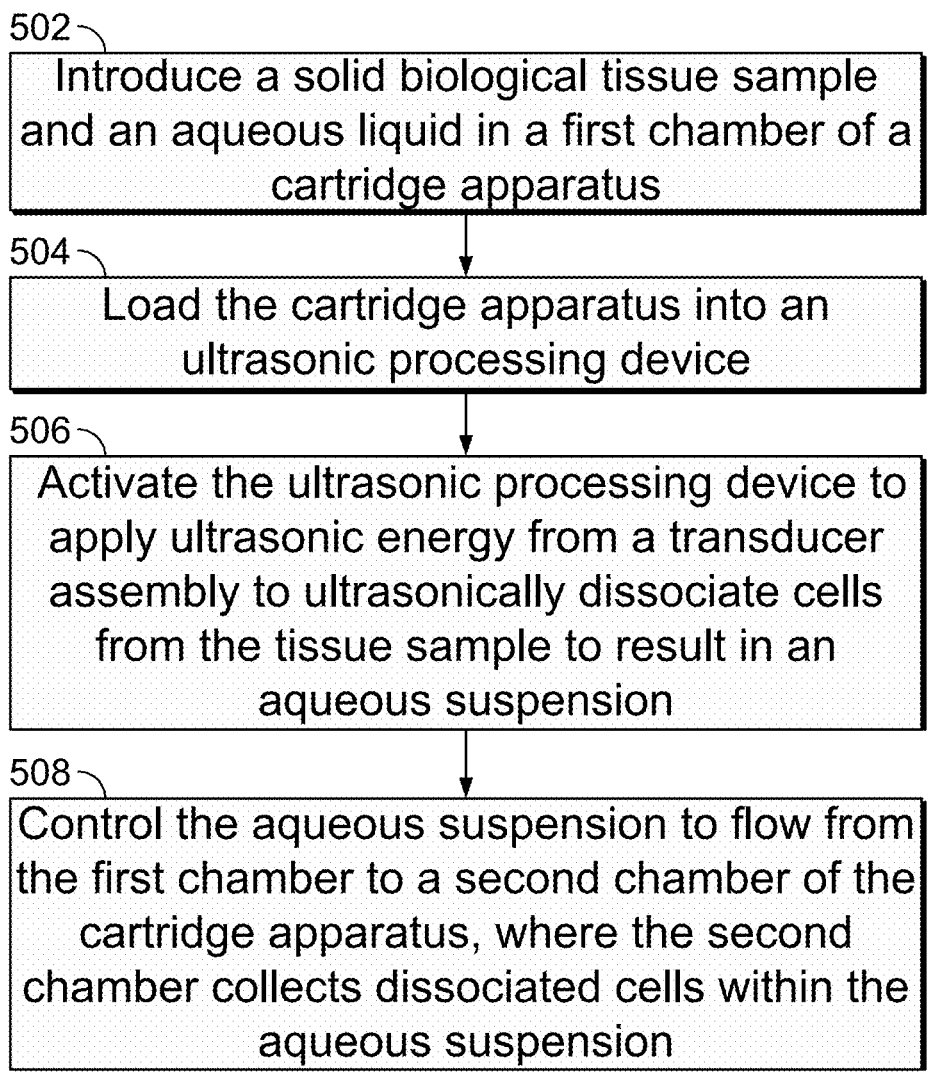
FIG. 5 illustrates a method for operating a self-contained cartridge apparatus to dissociate a solid biological tissue sample into viable cells, according to some embodiments.

FIG. 5 illustrates a method 500 for operating a self-contained cartridge apparatus to dissociate a solid biological tissue sample into viable cells, according to some embodiments. In some embodiments, the cartridge apparatus may be cartridge apparatus 102 of FIG. 1, cartridge apparatus 200 of FIG. 2, or cartridge apparatus 300 of FIG. 3.

In step 502, the solid biological tissue sample and an aqueous liquid is introduced into a first chamber of the cartridge apparatus. In some embodiments, the first chamber includes a first inlet that allows the tissue sample to be placed within the first chamber. In some embodiments, the first chamber may be, for example, loading chamber 204 of FIG. 2 or loading chamber 306 of FIG. 3. In some embodiments, the aqueous liquid can be introduced into the cartridge apparatus through a separate inlet of one or more fluid supply chambers, as described above with respect to FIGS. 1-2.

In some embodiments, the tissue sample can be minced within the first chamber of the cartridge apparatus. In some embodiments, the first chamber is configured to receive a mincing apparatus including a pestle apparatus and a mortar apparatus to mince the tissue sample. In some embodiments, the tissue sample can be transferred from the first chamber to another chamber in the cartridge apparatus to be minced.

In step 504, the cartridge apparatus is loaded into an ultrasonic processing device such that the first chamber is aligned with a transducer assembly of the processing device. In some embodiments, the tissue sample can be minced within the first chamber after the cartridge apparatus is loaded into the ultrasonic processing device.

In step 506, the ultrasonic processing device is activated to apply ultrasonic energy from the transducer assembly to ultrasonically dissociate cells from the tissue sample in the first chamber to result in an aqueous suspension. In some embodiments, the ultrasonic transducer array is configured to generate and direct ultrasonic waves with high levels of lateral ultrasonic thrust towards the first chamber. These ultrasonic waves generate bulk lateral energy that applies a mixing and suspending force in the fluid in the first chamber to dissociate cells from the tissue sample. In some embodiments, the aqueous suspension includes the aqueous fluid of step 502, a residual portion of the tissue sample, dissociate cells, and effluent materials such as cellular debris and extracellular debris.

In some embodiments, the ultrasonic processing device can be activated for a predetermined period of time selected by a user. In some embodiments, the ultrasonic processing device can be controlled to start and stop generation of ultrasonic waves based on user control. For example, the processing unit may include a user interface that allows the user to control its operation, as described above with respect to ultrasonic processing device 120 of FIG. 1.

In step 508, the aqueous suspension is controlled to flow from the first chamber to a second chamber of the cartridge apparatus, where the second chamber is configured to collect dissociated cells within the aqueous suspension. In some embodiments, the aqueous suspension can be controlled to flow through a series of two or more filtration chambers to filter effluent materials from the aqueous suspension, as described above with respect to FIG. 2.

FIG. 6 illustrates a method 600 for operating a filter device to enhance dissociation of viable cells from a solid biological tissue sample, according to some embodiments. In some embodiments, the filter device can be filter apparatus 310, as described with respect to FIG. 3, or filter device 402, as described with respect to FIG. 4.

In step 602, a tubular body of the filter device is telescopically inserted into a container containing the biological tissue sample in an aqueous fluid. In some embodiments, the filter device includes a cell-filter mesh that covers a bottom opening of the tubular body. In some embodiments, the tubular body forms a slip fit with the container during insertion.

In step 604, the tubular body of the filter device is fully inserted in the container to compress the biological tissue sample with the cell-filter mesh. The act of the cell-filter mesh compressing the biological tissue sample expels dissociated cells physically located within the fibrous mesh of the extracellular matrix of the biological tissue sample. In some embodiment, filter device is fully inserted when the tubular body is inserted until it reaches the bottom of the container and/or cannot be further inserted. For example, the tubular body may include a raised portion that prevents the tubular body from being extended more than a predefined distance. In another example, the container may include a stopper material attached to the bottom of the container having a preselected height that prevents the tubular body from being extended into the container more than the predefined distance.

In some embodiments, the tubular body can be iteratively lifted (e.g., withdrawn) and reinserted to repeatedly compress the biological tissue sample in the container to increase an amount of expelled cells. In some embodiments, the filter device can be operated to iteratively press the biological tissue a predetermined number of instances before the expelled cells in the aqueous solution is to be transported to a collection chamber. In some embodiments, the biological tissue sample can be ultrasonically dissociated by ultrasonic process device 102 before one or more filter presses.

In some embodiments, after the aqueous solution is transported to the collection chamber, as described above in FIGS. 1-3, additional aqueous fluid can be introduced into the container. Then, the filter device can be configured to perform method 602-604 and/or iteratively withdrawn and reinsert the filter device within the container to enable further cells to be expelled from the extracellular matrix of the biological tissue sample.

Exemplary Embodiments

Embodiments 1. An apparatus for dissociating single cells from a solid biological tissue sample, the apparatus comprising: a housing unit configured to enable the apparatus to be loadable into an ultrasonic processing device; a first chamber configured to receive the solid biological tissue sample and an aqueous fluid, wherein the first chamber is aligned with a transducer assembly of the processing device when the apparatus is loaded in the processing device to enable ultrasonic energy applied by the processing device to dissociate cells from the biological tissue sample to result in an aqueous suspension; a channel fluidly connecting the first chamber to a second chamber; and the second chamber configured to collect the dissociated cells within the aqueous suspension that flows through the channel from the first chamber.

Embodiments 2. The apparatus of embodiment 1, wherein the second chamber is detachable from the apparatus.

Embodiments 3. The apparatus of embodiment 1 or 2, wherein the first chamber comprises a first inlet for receiving the solid tissue sample and the aqueous fluid from outside of the apparatus.

Embodiments 4. The apparatus of embodiment 3, wherein the first chamber comprises a lid to seal the received solid tissue sample and the aqueous fluid from an exterior environment.

Embodiments 5. The apparatus of any one of embodiments 1-4, wherein the first chamber comprises a bottom surface that is acoustically conductive to enable the ultrasonic energy to enter the first chamber to dissociate cells from the biological tissue.

Embodiments 6. The apparatus of embodiment 5, wherein the bottom surface comprises a flat layer configured to couple to the transducer assembly when the apparatus is loaded in the processing device.

Embodiments 7. The apparatus of any one of embodiments 1-6, wherein the aqueous fluid comprises a cell media solution.

Embodiments 8. The apparatus of any one of embodiments 1-7, further comprising: a connector component coupled to the channel and configured to connect with an actuating device of the processing device, wherein the actuating device is configured to control flow of fluids through the channel.

Embodiments 9. The apparatus of embodiment 8, wherein the actuating device comprises a pump or a plunger.

Embodiments 10. The apparatus of embodiment 8 or 9, wherein the connector component comprises a fitting or an adaptor configured to connect the channel the actuating device.

Embodiments 11. The apparatus of any one of embodiments 8-10, further comprising a valve positioned in the channel and configured to be controlled by an actuating device of the processing device to control flow of fluids through the channel.

Embodiments 12. The apparatus of any one of embodiments 1-11, further comprising a third chamber including a third inlet for receiving second aqueous fluid into the interior of the apparatus.

Embodiments 13. The apparatus of embodiment 12, further comprising a channel that fluidly couples the third chamber to the first chamber to enable the second aqueous fluid to flow into the first chamber.

Embodiments 14. The apparatus of any one of embodiments 1-13, further comprising: a series of two or more filtration chambers that connect the first chamber to the second chamber, wherein the channel comprises a plurality of sub-channels that fluidly connect successive chambers in the series of two or more filtration chambers to enable the aqueous fluid to flow from the first chamber to the second chamber.

Embodiments 15. The apparatus of embodiment 14, wherein the two or more filtration chambers are configured to capture effluent materials in the aqueous fluid as the aqueous fluid flows through the plurality of sub-channels to enable targeted components to be collected in the second chamber.

Embodiments 16. The apparatus of embodiment 15, wherein the effluent materials comprise non-targeted components, cellular debris, and extracellular debris.

Embodiments 17. The apparatus of embodiment 15 or 16, wherein a filtration chamber comprises one or more marker beads configured to bind to the effluent materials to prevent the effluent materials from flowing through the filtration chamber.

Embodiments 18. The apparatus of any one of embodiments 14-17, wherein a filtration chamber from the two or more filtration chambers is configured to be aligned with a second transducer assembly of the processing device when the apparatus is loaded in the processing device, and wherein the filtration chamber comprises a bottom surface that acoustically couples the filtration chamber to the second transducer assembly to receive ultrasonic energy from the processing device to promote the selective flow of the targeted components.

Embodiments 19. The apparatus of any one of embodiments 15-18, wherein the second chamber is configured to collect the targeted intracellular or extracellular analytes of interest, and wherein the apparatus further comprises: a one-way channel that fluidly connects the second chamber to the first chamber to enable aqueous fluid to flow back to the first chamber.

Embodiments 20. The apparatus of any one of embodiments 14-19, wherein the plurality of sub-channels is configured to allow the aqueous fluid to flow back through the series of two or more filtration chambers without backflowing into the first chamber.

Embodiments 21. A method for dissociating single cells from a solid biological tissue sample, the method comprising: introducing the solid biological tissue sample and an aqueous liquid into a first chamber of a cartridge apparatus; loading the cartridge apparatus into an ultrasonic processing device, wherein the first chamber is aligned with a transducer assembly of the processing device; activating the ultrasonic processing device to apply ultrasonic energy from the transducer assembly to ultrasonically dissociate cells from the tissue sample to result in an aqueous suspension in the first chamber; and controlling the aqueous suspension to flow from the first chamber to a second chamber of the cartridge apparatus, wherein the second chamber is configured to collect dissociated cells within the aqueous suspension.

Embodiments 22. The method of embodiment 21, further comprising: mincing the tissue sample within the first chamber.

Embodiments 23. The method of embodiment 22, wherein mincing the tissue sample comprises: inserting a pestle apparatus and a mortar apparatus into the container; and mincing the tissue sample using the inserted pestle apparatus and the mortar apparatus.

Embodiments 24. The method of any one of embodiments 21-23, further comprising: detaching the second chamber from the cartridge apparatus.

Embodiments 25. The method of any one of embodiments 21-24, further comprising: receiving, via a first inlet of the first chamber, the solid tissue sample and the aqueous fluid from outside of the apparatus.

Embodiments 26. The method of any one of embodiments 21-25, wherein the first chamber comprises a lid, and wherein the method further comprises: sealing the received solid tissue sample and the aqueous fluid from an exterior environment by closing the lid.

Embodiments 27. The method of any one of embodiments 21-26, wherein the first chamber comprises a bottom surface that is acoustically conductive to enable the ultrasonic energy to enter the first chamber to dissociate cells from the biological tissue.

Embodiments 28. The method of embodiment 27, wherein the bottom surface comprises a flat layer, and wherein the method further comprises: coupling the flat layer of the cartridge apparatus to the transducer assembly when the cartridge apparatus is loaded in the processing device.

Embodiments 29. The method of any one of embodiments 21-28, wherein the aqueous fluid comprises a cell media solution.

Embodiments 30. The method of any one of embodiments 21-29, wherein the cartridge apparatus further comprises a connector component coupled to the channel, and wherein the method further comprises: connecting the channel with an actuating device of the processing device using the connector component, wherein the actuating device is configured to control flow of fluids through the channel.

Embodiments 31. The method of embodiment 30, wherein the actuating device comprises a pump or a plunger.

Embodiments 32. The method of embodiment 30 or 31, wherein the connector component comprises a fitting or an adaptor configured to connect to the channel the actuating device.

Embodiments 33. The method of any one of embodiments 30-32, wherein the cartridge apparatus further comprises a valve positioned in the channel, and wherein the method further comprises: operating the valve by an actuating device of the processing device to control flow of fluids through the channel.

Embodiments 34. The method of any one of embodiments 21-33, wherein the cartridge apparatus further comprises a third chamber including a third inlet, and wherein the method further comprises: receiving second aqueous fluid into the interior of the apparatus via the third inlet.

Embodiments 35. The method of embodiment 34, wherein the method further comprises: fluidly coupling the third chamber to the first chamber via a channel to enable the second aqueous fluid to flow into the first chamber.

Embodiments 36. The method of any one of embodiments 21-35, wherein the cartridge apparatus further comprises a series of two or more filtration chambers that connect the first chamber to the second chamber, and wherein the channel comprises a plurality of sub-channels that fluidly connect successive chambers in the series of two or more filtration chambers to enable the aqueous fluid to flow from the first chamber to the second chamber.

Embodiments 37. The method of embodiment 36, further comprising: aligning a filtration chamber from the two or more filtration chambers with a second transducer assembly of the processing device when the cartridge apparatus is loaded in the processing device, wherein the filtration chamber comprises a bottom surface that acoustically couples the filtration chamber to the second transducer assembly to receive ultrasonic energy from the processing device to promote the selective flow of the targeted components.

Embodiments 38. A filter device for enhanced dissociation of viable cells from a solid biological tissue sample, the filter device comprising: a tubular body configured to be telescopically inserted into a container containing a biological tissue sample in an aqueous fluid; and a cell-filter mesh covering a bottom opening of the tubular body, wherein the cell-filter mesh is configured to compress the biological tissue sample to expel cells from the tissue sample when the filter device is fully inserted into the container.

Embodiments 39. The filter device of embodiment 38, wherein the cells are expelled into a surrounding aqueous fluid that flows into the center of the tubular body through the cell-filter mesh.

Embodiments 40. The filter device of embodiment 38 or 39, further comprising: a transport channel that transports the expelled cells that flows into the center of the tubular body to a collection chamber.

Embodiments 41. The filter device of embodiment 40, wherein the transport channel comprises a tube that runs inside and along the length of the tubular body.

Embodiments 42. The filter device of any one of embodiments 38-41, wherein a lower portion of the tubular body is submerged in the container when the tubular body is fully inserted into the container, and wherein the lower portion comprises one or more openings covered by one or more corresponding cell-filter meshes.

Embodiments 43. The filter device of embodiment 42, wherein the cells are expelled into a surrounding aqueous fluid that flows into the center of the tubular body through the one or more cell-filter meshes corresponding to the one or more openings of the lower portion.

Embodiments 44. The filter device of any one of embodiments 38-43, wherein the tubular body is configured to be extended into the container by at most a predetermined distance to enable the cell-filter mesh to compress the biological tissue sample.

Embodiments 45. The filter device of embodiment 44, wherein the tubular body comprises a raised portion that prevents the tubular body from being extended further than the predetermined distance into the container.

Embodiments 46. The filter device of embodiment 44 or 45, wherein the container further comprises a stopper material at the bottom of the container that prevents the tubular body from being extended more than the predetermined distance into the container.

Embodiments 47. The filter device of embodiment 46, wherein the stopper material comprises a sponge, rubber, or plastic.

Embodiments 48. The filter device of any one of embodiments 38-47, wherein the biological tissue sample is ultrasonically dissociated into cells before being compressed by the cell-filter mesh.

Embodiments 49. The filter device of any one of embodiments 38-48, wherein the biological tissue sample is enzymatically dissociated into cells before being compressed by the cell-filter mesh.

Embodiments 50. The filter device any one of embodiments 38-49, wherein the container corresponds to a reaction chamber of a cartridge apparatus.

Embodiments 51. A method for enhanced dissociation of viable cells from a solid biological tissue sample, the method comprising: telescopically inserting a tubular body of the filter device into a container containing a biological tissue sample in an aqueous fluid, wherein the filter device comprises a cell-filter mesh that covers a bottom opening of the tubular body; and fully inserting the tubular body of the filter device in the container to compress the biological tissue sample with the cell-filter mesh, wherein the cell-filter mesh compresses the biological tissue sample to expel cells from the tissue sample.

Embodiments 52. The method of embodiment 51, further comprising: withdrawing the tubular body of the filter device from the container; and iteratively performing the fully inserting and the withdrawing of the tubular body of the filter device to repeatedly compress the biological tissue sample to increase an amount of expelled cells.

Embodiments 53. The method of embodiment 51 and 52, wherein the cells are expelled into a surrounding aqueous fluid that flows into the center of the tubular body through the cell-filter mesh.

Embodiments 54. The method of any one of embodiments 51-53, further comprising: transporting the expelled cells that flows into the center of the tubular body to a collection chamber.

Embodiments 55. The method of embodiment 54, wherein the transport channel comprises a tube that runs inside and along the length of the tubular body.

Embodiments 56. The method of any one of embodiments 51-55, further comprising: submerging a lower portion of the tubular body in the container when the tubular body is fully inserted into the container, wherein the lower portion comprises one or more openings covered by one or more corresponding cell-filter meshes.

Embodiments 57. The method of embodiment 56, wherein the cells are expelled into a surrounding aqueous fluid that flows into the center of the tubular body through the one or more cell-filter meshes corresponding to the one or more openings of the lower portion.

Embodiments 58. The method of any one of embodiments 51-57, comprising: extending the tubular body into the container by at most a predetermined distance to enable the cell-filter mesh to compress the biological tissue sample.

Embodiments 59. The method of embodiment 58, wherein the tubular body further comprises a raised portion that prevents the tubular body from being extended further than the predetermined distance into the container.

Embodiments 60. The method of embodiment 58 or 59, wherein the container further comprises a stopper material at the bottom of the container that prevents the tubular body from being extended more than the predetermined distance into the container.

Embodiments 61. The method of embodiment 60, wherein the stopper material comprises a sponge, rubber, or plastic.

Embodiments 62. The method of any one of embodiments 51-61, further comprising: ultrasonically dissociating the tissue sample into cells before telescopically inserting the tubular body of the filter to compress the tissue sample by the cell-filter mesh.

Embodiments 63. The method of any one of embodiments 51-62, further comprising: enzymatically dissociating the tissue sample into cells before telescopically inserting the tubular body of the filter to compress the tissue sample by the cell-filter mesh.

Embodiments 64. The method of any one of embodiments 51-63, wherein the container corresponds to a reaction chamber of a cartridge apparatus.

Embodiment 65. A cartridge for dissociating and obtaining separated individual cells from a biological sample, the cartridge comprising: (a) a sample processing unit comprising: a sealable port configured to receive the biological sample for introduction to the sample processing unit; a sample chamber configured to collect the biological sample; and a mincer, wherein the mincer is configured to interface with the sample chamber; (b) a reaction unit comprising a reaction chamber configured to receive ultrasonic energy, wherein the sample processing unit and the reaction unit are connected via a first channel; (c) a filtration unit comprising: a filtration chamber; and a filtration device configured to enter the filtration chamber, wherein the reaction chamber and the filtration unit are connected via a second channel; and (d) a collection unit configured to receive the separated individual cells from the biological sample, wherein the filtration unit and the collection unit are connected via a third channel.

Embodiments 66. The cartridge of embodiment 65, further comprising a first gate configured to control the fluidic connection between: the sample processing unit and the reaction unit via the first channel; and/or the reaction unit and the filtration unit via the second channel.

Embodiments 67. The cartridge of embodiment 66, wherein the first gate is configured to be positioned in a first location, and wherein when the first gate is in the first position the sample processing unit and the reaction unit are fluidically connected and the reaction unit and the filtration unit are not fluidically connected.

Embodiments 68. The cartridge of embodiment 66 or 67, wherein the first gate is configured to be positioned in a second location, and wherein when the first gate is in the second position the reaction unit and the filtration unit are fluidically connected and the sample processing unit and the reaction unit are not fluidically connected.

Embodiments 69. The cartridge of any one of embodiments 65-68, further comprising a second gate configured to control the fluidic connection between the filtration unit and the collection unit via the third channel.

Embodiments 70. The cartridge of embodiment 69, wherein the second gate is configured to be position in a first location, wherein when the second gate is in the first position the filtration unit and the collection unit are not fluidically connected.

Embodiments 71. The cartridge of embodiment 69 or 70, wherein the second gate is configured to be position in a second location, wherein when the second gate is in the second position the filtration unit and the collection unit are fluidically connected.

Embodiments 72. The cartridge of any one of embodiments 65-71, wherein the first channel, the second channel, and the third channel are positioned and configured such that flow between the sample processing unit, the reaction unit, the filtration unit, and the collection unit is controlled by tilting of the cartridge.

Embodiments 73. The cartridge of any one of embodiments 65-72, wherein the sealable port of the sample processing unit is also configured to receive a fluid for introduction to the sample processing unit.

Embodiments 74. The cartridge of any one of embodiments 65-72, wherein a wall of the sealable port of the sample processing unit slopes toward the sample chamber.

Embodiments 75. The cartridge of any one of embodiments 65-74, further comprising a cap configured to seal the sealable port of the sample processing unit.

Embodiments 76. The cartridge of any one of embodiments 65-75, wherein the sample chamber comprises one or more centrally sloping walls.

Embodiments 77. The cartridge of any one of embodiments 65-76, wherein the reaction chamber of the reaction unit comprises a bottom surface that is acoustically conductive.

Embodiments 78. The cartridge of clam 77, wherein the bottom surface of the reaction chamber is substantially flat.

Embodiments 79. The cartridge of any one of embodiments 65-78, wherein the reaction chamber of the reaction unit comprises a cylindrical wall.

Embodiments 80. The cartridge of any one of embodiments 65-79, wherein the filtration device of the filtration unit comprises a tubular assembly, wherein an outer surface of the tubular assembly is configured to provide a seal with a side wall of the filtration chamber, and wherein the tubular assembly comprises a cell-filter mesh covering a bottom opening of the tubular assembly.

Embodiments 81. The cartridge of embodiment 80, wherein the side wall of the filtration chamber is cylindrical.

Embodiments 82. The cartridge of any one of embodiments 65-81, wherein the filtration chamber of the filtration unit comprises a bottom surface having a convex structure.

Embodiments 83. The cartridge of any one of embodiments 65-82, wherein the filtration unit comprises a vent.

Embodiments 84. The cartridge of any one of embodiments 65-83, wherein the collection unit is configured to receive a removable collection device for receiving single cells from the biological sample.

Embodiments 85. The cartridge of embodiment 84, wherein the removable collection device is an Eppendorf tube.

Embodiments 86. The cartridge of embodiment 85, wherein the cartridge is configured to be loadable into an ultrasonic processing device.

Embodiments 87. An ultrasonic processing device comprising: (a) an ultrasonic transducer; (b) a temperature-controlled water bath; (c) a tilting assembly, wherein the tilting assembly is configured to hold a cartridge of any one of embodiments 65-86 such that (i) a reaction chamber of the cartridge is positioned relative to the ultrasonic transducer, and (ii) the reaction chamber, a sample chamber, and a filtration chamber of the cartridge, or portions thereof, are positioned relative to a water level of the temperature-controlled water bath, the tilting assembly comprising: a tilting actuator; a mincer actuator; and a filter actuator; and (d) a control unit.

Embodiments 88. The ultrasonic processing device of embodiment 87, further comprising one or more gate actuators each configured to interface with a gate of the cartridge.

Embodiments 89. The ultrasonic processing device of embodiment 87 or 88, wherein the tilting assembly is configured to hold the cartridge such that when a removable collection device is placed in a collection unit of the cartridge, the removable collection device, or a portion thereof, is positioned relative to the water level of the temperature-controlled water bath.

Embodiments 90. The ultrasonic processing device of embodiment 89, wherein the reaction chamber, the sample chamber, and the filtration chamber, and the removable collection device, or portions thereof, are below the water level of the temperature-controlled water bath.

Embodiments 91. The ultrasonic processing device of any one of embodiments 87-90, wherein the mincer actuator comprises a clip to interface with a mincer of the cartridge.

Embodiments 92. The ultrasonic processing device of any one of embodiments 87-91, wherein the filter actuator comprises a clip to interface with a filtration device of the cartridge.

Embodiments 93. The ultrasonic processing device of any one of embodiments 87-92, wherein the control unit comprises: one or more processors; and a memory storing one or more programs, the one or more programs configured to be executed by the one or more processors, the one or more programs including instructions for executing a method for dissociating and obtaining separated individual cells from a biological sample.

Embodiments 94. The ultrasonic processing device of embodiment 93, wherein the instructions for executing the method for dissociation and obtaining separated individual cells from the biological sample comprise instructions for any one or more of: operating the ultrasonic transducer; operating the tilting actuator; operating mincer actuator; operating the filter actuator; operating one or more gate actuators; and operating the temperature-controlled water bath.

Embodiments 95. A method for obtaining separated individual cells from a biological sample, the method comprising: loading a cartridge of any one of embodiments 65-86 into an ultrasonic processing device of any one of embodiments 87-94; loading a biological sample into a sample processing unit of the cartridge via a sealable port; and commencing a programmed method of the ultrasonic processing device to dissociate and obtain separated individual cells from the biological sample.

EXAMPLES

Example 1

Assessing Gene Expression Profiles of Processed Tissue Samples

As explained in the Background above, the use of enzymes to dissociate cells from tissue samples is likely to significantly alter the gene expression profile of genes in dissociated cells due to the stress induced by enzymatic dissociation. In contrast, operating the cartridge apparatus (e.g., cartridge apparatus 300 of FIG. 3) to apply ultrasonic dissociation (e.g., applying bulk ultrasonic energy) is less likely to change the gene expression profile of the genes.

To observe the improvement achieved using ultrasonic energy as opposed to enzymes in cell dissociation, experiments were performed on four 45 mg tissue samples excised from the same commercially acquired pig liver. The first sample was kept in its solid, unprocessed tissue state as a control sample whose gene expression profiles can be compared to the gene expression profiles of the other processed tissue samples. The second sample was dissociated into a suspension of cells using a standard Miltenyi enzymatic tissue dissociation protocol (offered by Mitenyi), which is representative of the current approach of performing cell dissociation using enzymes. The third sample was dissociated into a suspension of cells by applying ultrasonic energy to the third sample placed in a reaction chamber of cartridge apparatus 300. The fourth sample was ultrasonically dissociated using a similar approach as applied on the third sample.

All four samples were all frozen before RNA was extracted and assessed for minimum RIN values for valid sequencing data. Then, TruSeq stranded mRNA library prep kits from Illumina was used to extract RNA and perform mRNA sequencing on the four samples. The RNA was recovered from the four samples and sequenced on a NextSeq 500. Finally, the sequencing data of the four samples was analyzed using the Strand NGS data analysis tool to assess the impact that ultrasonic dissociation versus enzymatic dissociation has on the gene expression profile of tissue samples.

Figure 7A:
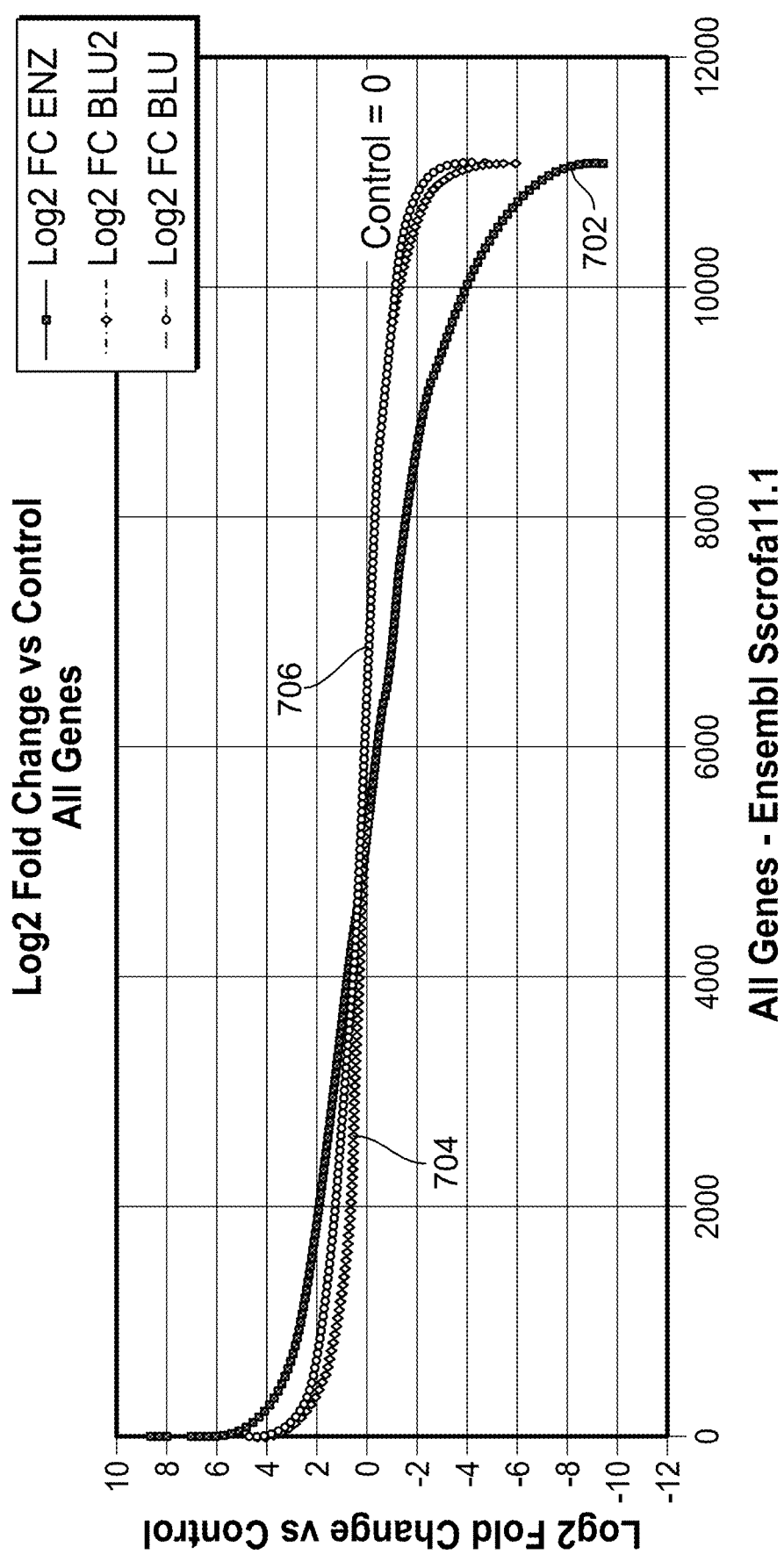
FIG. 7A is a chart that shows representative changes in gene expression profiles of an unprocessed pig liver tissue sample across all Ensembl Sscrofa11.1 genes when the pig liver tissue sample is dissociated using ultrasonic energy versus enzymes.

FIG. 7A is a chart 700A that shows representative changes in gene expression profiles of an unprocessed pig liver tissue sample across all Ensembl Sscrofa11.1 genes when the pig liver tissue sample is dissociated using ultrasonic energy versus enzymes. Chart 700A was generated by applying the experimental setup described above. The x-axis of chart 700A represents the genes in the Sscrofa11.1 assembly of the pig genome. The y-axis of chart 700A shows the log 2 fold change in the Sscrofa11.1 genes as compared to a control set at a value of 0. The control corresponds to the gene expression profile of the Sscrofa11.1 genes calculated for the first sample, i.e., the control and unprocessed sample. Line 702 represents the log 2 fold changes across Sscrofa11.1 genes for the second sample that was enzymatically dissociated. Lines 704 and 706 represent the log2fold changes across Sscrofa11.1 genes for the third and fourth samples, respectively, that were ultrasonically dissociated. As shown in chart 700A, line 702 has much larger log 2 fold changes for many Sscrofa11.1 genes as compared to lines 704 and 706. In other words, the third and fourth sample that were ultrasonically dissociated had a gene expression profile that more closely aligned with that of the natural, unprocessed tissue sample, i.e., the first sample.

Figure 7B:
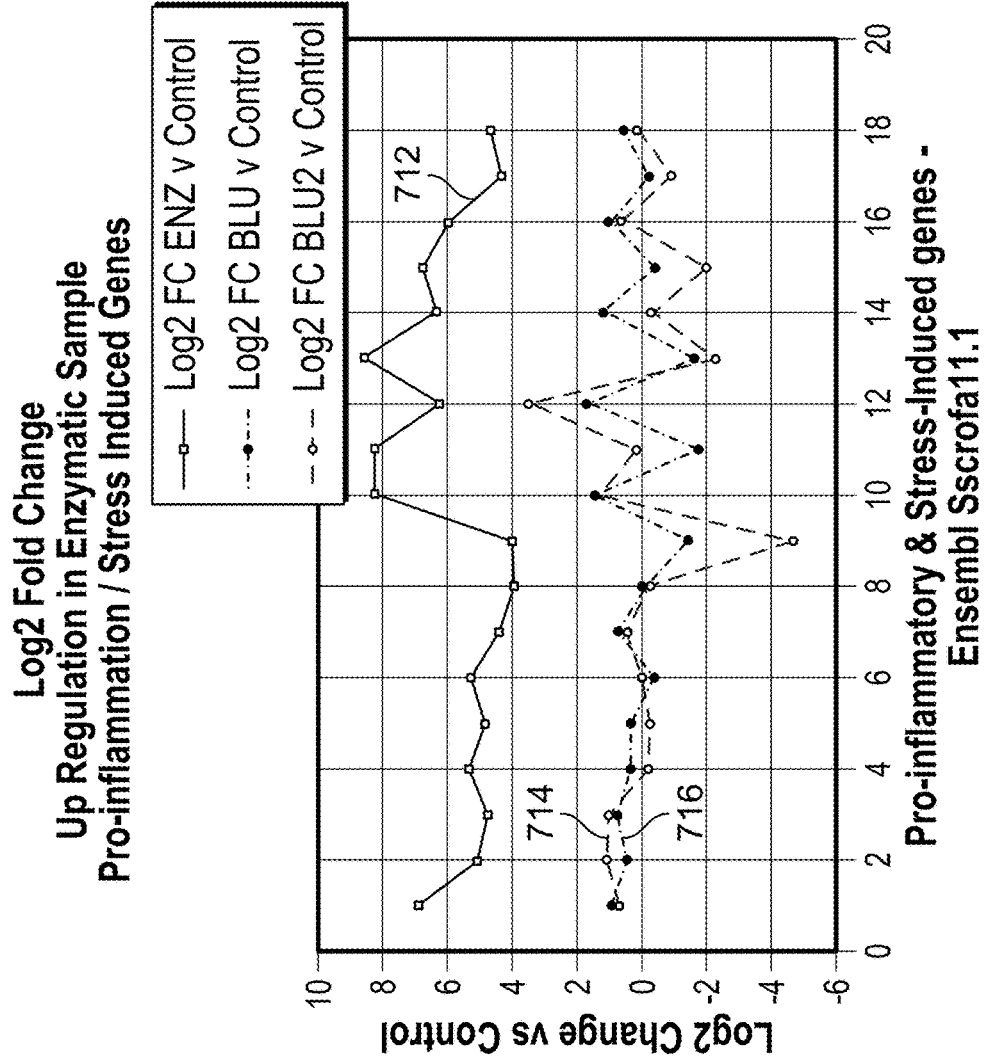
FIG. 7B is a chart that shows representative changes in gene expression profiles of an unprocessed pig liver tissue sample across selected pro-inflammatory and stress-induced genes of the Ensembl Sscrofa11.1 genes when the pig liver tissue sample is dissociated using ultrasonic energy versus enzymes.

FIG. 7B is a chart 700B that shows representative changes in gene expression profiles of an unprocessed pig liver tissue sample across selected pro-inflammatory and stress-induced genes 710 of the Ensembl Sscrofa 11.1 genes when the pig liver tissue sample is dissociated using ultrasonic energy versus enzymes. Chart 700B was generated by selecting 18 genes from the Ensembl Sscrofa11.1 genes on the x-axis of chart 700A. The x-axis of chart 700B represents the selected genes 710 from the Sscrofa 11.1 assembly of the pig genome. The y-axis of chart 700B shows the log 2 fold change in the selected genes as compared to a control set at a value of 0 and represented of the gene expression profile calculated for the first sample, i.e., the control and unprocessed sample. Line 712 represents the log 2 fold changes across selected genes 710 for the second sample that was enzymatically dissociated. Lines 714 and 716 represent the log 2 fold changes across selected genes 710 for the third and fourth samples, respectively, that were ultrasonically dissociated. As shown in chart 700B, line 712 has much larger log 2 fold changes for all selected genes 710 as compared to lines 714 and 716. In other words, enzymatic dissociated cells of the second sample shows signs of stress in gene expression, represented by the up regulation of the selected pro-inflammatory and stress-induced genes 710. In contrast, the third and fourth samples achieved much smaller log 2 changes, which means their gene expression profiles remain much closer to the natural, unprocessed first sample.

Example 2

Assessing Quantities of Obtained Viable Cells Using Filter Device

As explained above in the Background and with respect to FIG. 4, many dissociated viable cells can be trapped within a cellular matrix of a solid tissue sample after ultrasonic dissociation. Filter device 402 can be operated according to method 600 of FIG. 6 to press on and compress the solid tissue sample within a container to expel the trapped viable cells to increase the quantity of obtained viable cells. To observe the improvement achieved using filter device 402, a base-case experiment and two filter-press experiments were performed.

In the base-case experiment, ultrasonic dissociation was iteratively applied to a 41.3 mg pig liver tissue sample without any filter presses. Specifically, the following steps were performed:

1. The tissue sample was loaded in a 9 mm diameter reaction chamber (i.e., tube) of cartridge apparatus 300 without any mincing operations and without any enzymes;
2. Two minutes of ultrasonic energy was applied by ultrasonic processing device 120 to dissociate viable cells from the tissue sample;
3. Quantities of total recovered cells and total recovered viable cells were assessed from the ultrasonically dissociated tissue sample; and
4. Steps 2-3 were repeated for six rounds.

In the filter-press experiments, two 45 mg pig liver tissue samples were ultrasonically dissociated then filtered using filter device 402. Specifically, the following steps were performed for each filter-press experiment:
1. The tissue sample was loaded in a 9 mm diameter reaction chamber (i.e., tube) of cartridge apparatus 300 without any mincing operations and without any enzymes;
2. Two minutes of ultrasonic energy was applied by ultrasonic processing device 120 to dissociate viable cells from the tissue sample;
3. Six filter presses were applied to the tissue sample using filter device 402; and
4. Quantities of total recovered cells and total recovered viable cells were assessed from the ultrasonically dissociated tissue sample.

FIG. 8 is a table 800 that shows representative quantities of obtained viable cells when a pig liver tissue was ultrasonically dissociated versus ultrasonically dissociated and filter pressed. Table 800 was generated using the experimental setup described above. Specifically, table 800 includes base-case results 802 and filter-press results 804 derived from the base-case experiment and the filter-press experiments, respectively, as described above.

Base-case results 802 shows the total quantity of cells and the total quantity of viable cells per mg obtained at the end of each of the six round of ultrasonic dissociation. The base-case experiment obtained a cumulative total of 39,795 viable cells/mg at the end of the six rounds of ultrasonic dissociation. In contrast, filter-press results 804 shows the total quantity of cells and the total quantity of viable cells per mg obtained at the end of the two filter-press experiments (i.e., corresponding to samples 3-1 and 4-1). As shown in table 800, the two filter-press experiments obtained cumulative totals of 76,220 and 73,260 viable cells, respectively, which results in an average of 74,740 total viable cells per mg. Therefore, the results in table 800 demonstrate that the use of filter press 400 to expel cells achieved close to a two fold increase in the recovery rate of viable cells as compared to using only ultrasonic dissociation to obtain viable cells.

Example 3

Assessing Performance of Disclosed Cartridge Apparatus

To assess the performance of applying ultrasonic dissociation of tissue samples using the disclosed methods and cartridge apparatus, the following experiment protocol was performed for a plurality of pig liver tissue sample sizes (i.e., 10 mg to 200 mg):
1. A tissue sample of a selected size was loaded into loading chamber 306 of cartridge apparatus 300 along with 370 uL of DMEM aqueous solution;
2. Mincing apparatus 312 was used to apply 100 mince strokes to the tissue sample in cartridge apparatus 300;
3. An additional 370 uL of DMEM aqueous solution was added to loading chamber 306 of cartridge apparatus 300;
4. Two minutes of ultrasonic energy was applied by ultrasonic processing device 120 to dissociate viable cells from the tissue sample;
5. Six filter presses were applied to the tissue sample within cartridge apparatus 300 using a pre-wetted filter apparatus 310;
6. The aqueous suspension resulting from the filter presses were transferred through filter apparatus 310 to a recovery tube (e.g., collection chamber 308); and
7. A fraction of the ultrasonically dissociated tissue sample within the aqueous solution in the recovery tube was assessed to determine quantities of recovered viable cells.

Figure 9A:
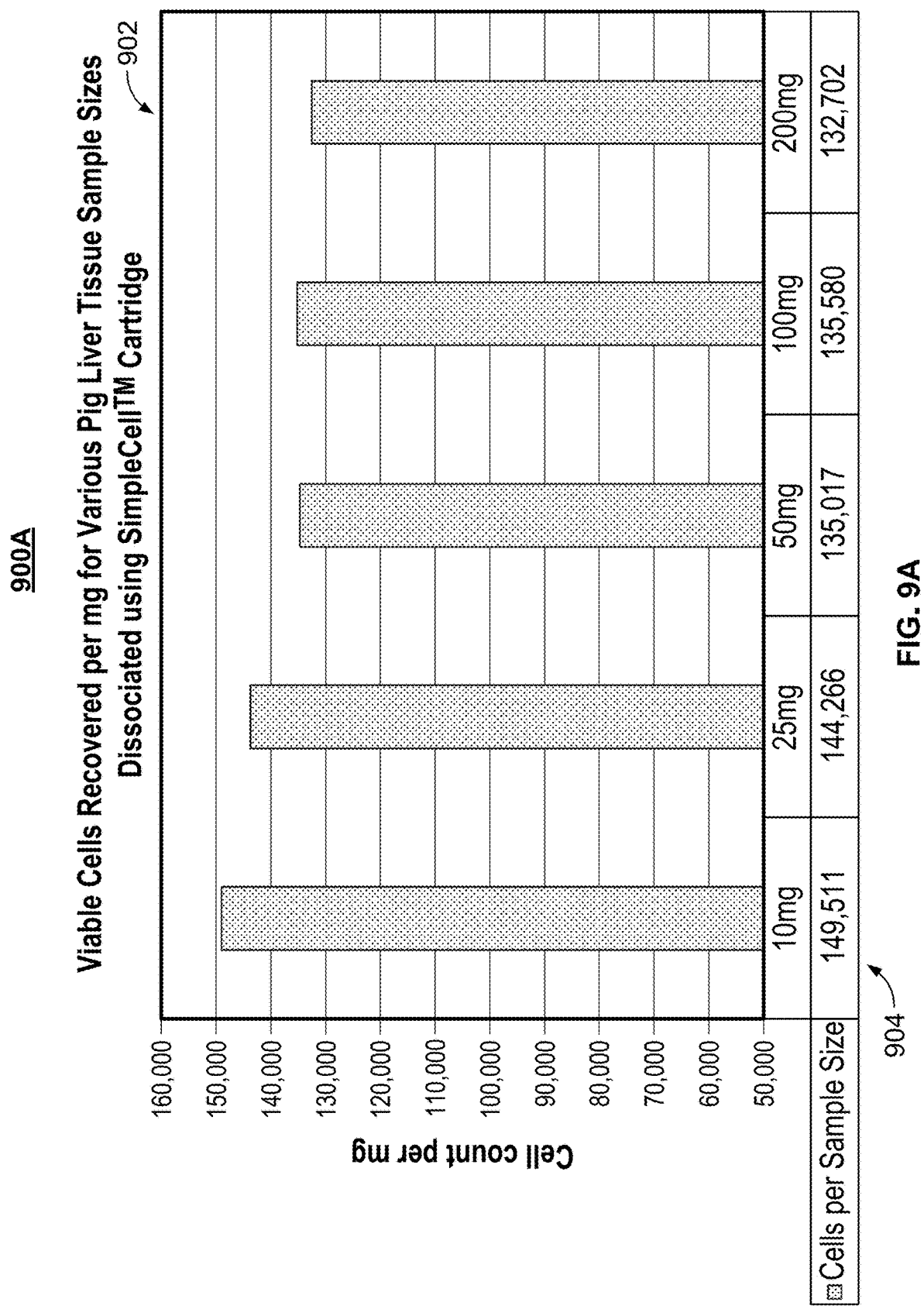
FIG. 9A is a chart that shows representative quantities of viable cells per milligram obtained from various sizes of pig liver tissue samples by applying ultrasonic dissociation and filter presses within a cartridge apparatus.

FIG. 9A is a chart 900A that shows representative quantities of viable cells per milligram obtained from various sizes of pig liver tissue samples by applying ultrasonic dissociation and filter presses within cartridge apparatus 300. Chart 900A was generated by applying the above experimental setup on the following sizes of pig liver tissue samples: 10 mg, 25 mg, 50 mg, 100 mg, and 200 mg. Chart 900A includes results shown in a bar chart portion 902 and a data table portion 904 corresponding to the bars in bar chart portion 902. As shown in chart 900A, a consistent total number of viable cells (i.e., at least 135,000 viable cells per mg) were dissociated from the pig liver tissue samples, independent of the tissue sample sizes.

Figure 9B:
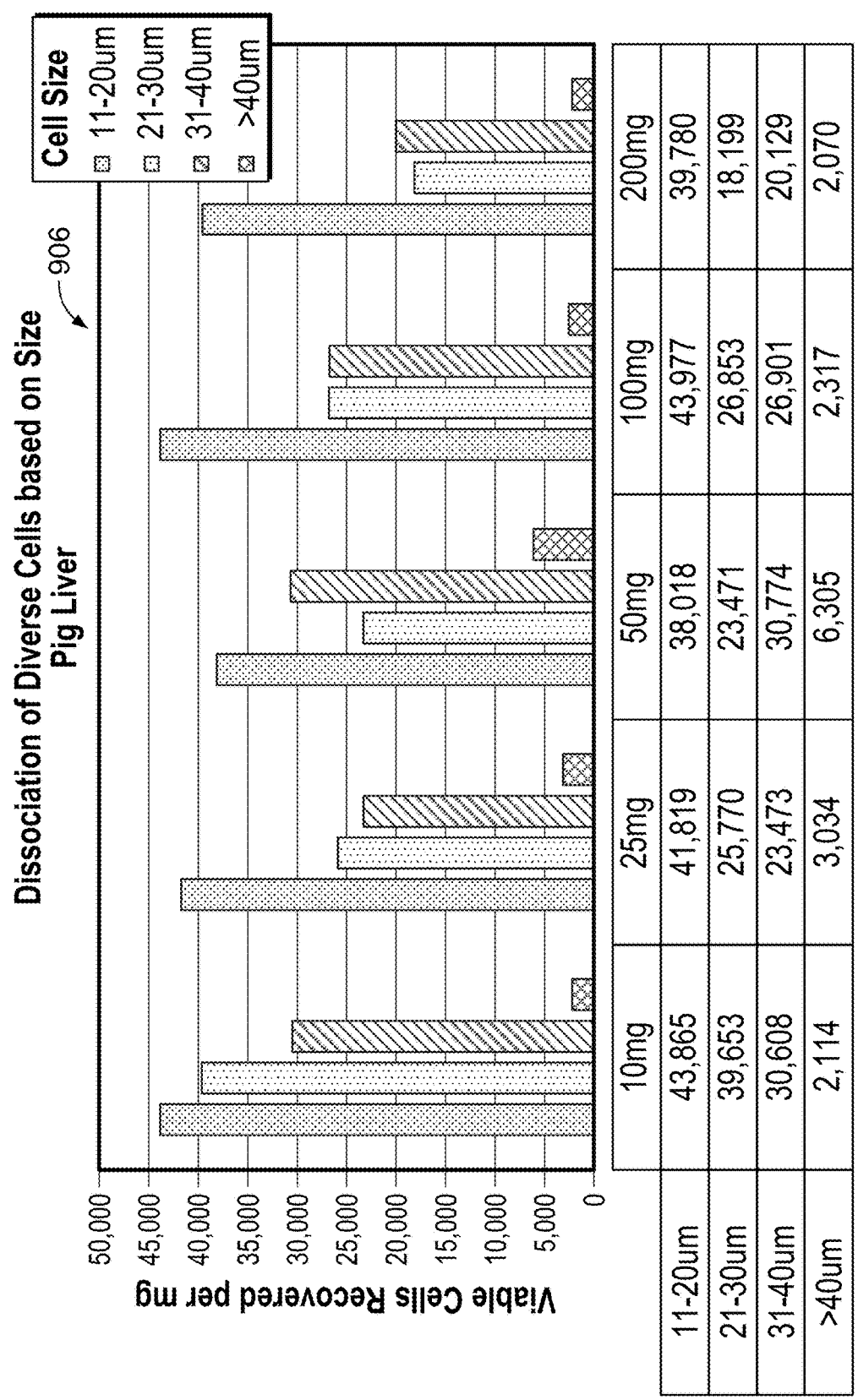
FIG. 9B is a chart that shows representative quantities of viable cells per milligram of various cell sizes obtained from various sizes of pig liver tissue samples by applying ultrasonic dissociation and filter presses within a cartridge apparatus.

FIG. 9B is a chart 900B that shows representative quantities of viable cells per milligram of various cell sizes obtained from various sizes of pig liver tissue samples by applying ultrasonic dissociation and filter presses within cartridge apparatus 300. Chart 900B was generated by assessing the cell sizes of obtained viable cells per mg shown in chart 900A. Chart 900B includes a bar chart portion 906 and a data table portion 908 corresponding to the bars in bar chart portion 902. In particular, bar chart portion 906 graphically shows the viable cells recovered per mg for four types of cell sizes (i.e., 11-20 um, 21-30 um, 31-40 um, and >40 um) across five different tissue sample sizes (i.e., 10 mg, 25 mg, 50 mg, 100 mg, and 200 mg). Data table portion 908 shows the numerical values corresponding to the bars shown in bar chart portion 906. As shown in chart 900B, a diverse population of cells having diverse cell sizes were successfully dissociated from tissue samples of various sizes.

Example 4

Exemplary Cartridge, Device, and Method of use for Obtaining Separated Individual Cells from a Biological Sample This example demonstrates an exemplary cartridge of the present application, and a device and method of use thereof for obtaining separated individual cells from a biological sample.

Figure 10A:
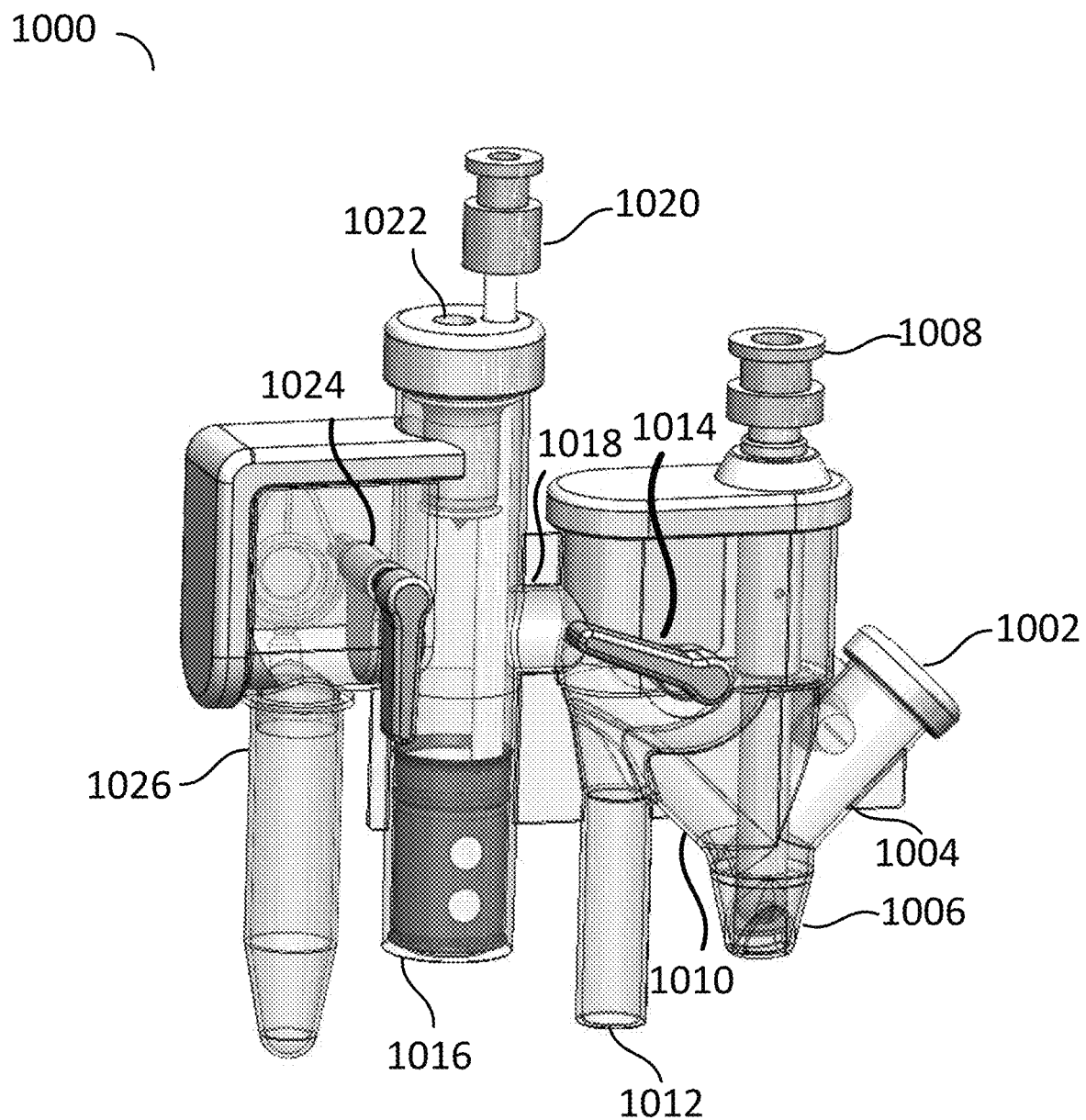
FIG. 10A shows a schematic for a cartridge described herein.

The designed cartridge is illustrated in the schematic of FIG. 10A. As depicted therein, the cartridge 1000 was configured to have a sample processing unit comprising a sealable port 1002 and a sloping wall 1004 to direct the material, such as the biological sample, to the sample chamber 1006. The sample chamber 1006 was configured to have centrally sloping walls to ensure that the biological sample and any added material were concentrated in a pre-determined portion of the sample chamber, namely, where the mincer 1008 interfaced with the sample chamber.

The sample processing unit and mincer 1008 were configured such that the mincer will process, such as breakdown, the biological sample when repetitively lowered and raised into the sample chamber. The cartridge 1000 was configured to have a sloping first channel 1010 to guide material from the sample processing unit to the reaction chamber 1012 when tilting the cartridge 1000. The cartridge 1000 was configured to have a first gate 1014 to control the flow of material between the sample chamber 1006 and the reaction chamber 1012, and between the reaction chamber 1012 and the filtration chamber 1016. The cartridge 1000 was configured to have a second channel 1018 connecting the reaction chamber 1012 and the filtration unit. The filtration unit was configured to have a filtration chamber 1016 having a convex bottom surface, a filtration device 1020, and an air vent 1022. The cartridge was configured to have a third channel connecting the filtration unit and the collection unit, wherein a second gate 1024 controlled the flow of material through the third channel. The cartridge 1000 was configured to hold and create a seal with an Eppendorf tube 1026 to collect the separated individual cells.

Figure 10B:
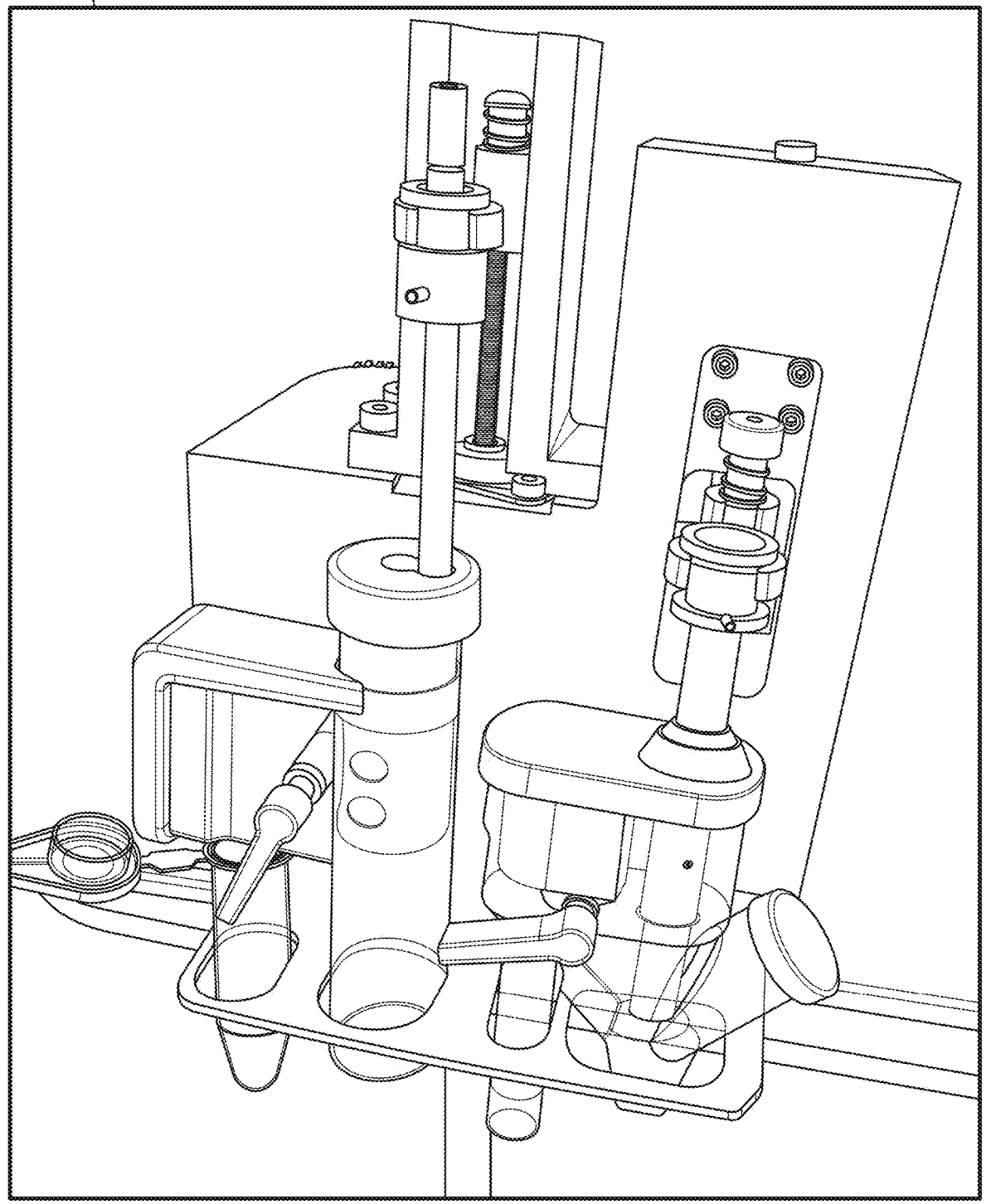
FIGS. 10B and 10C show pictures of the cartridge in a tilting assembly.
Figure 10C:
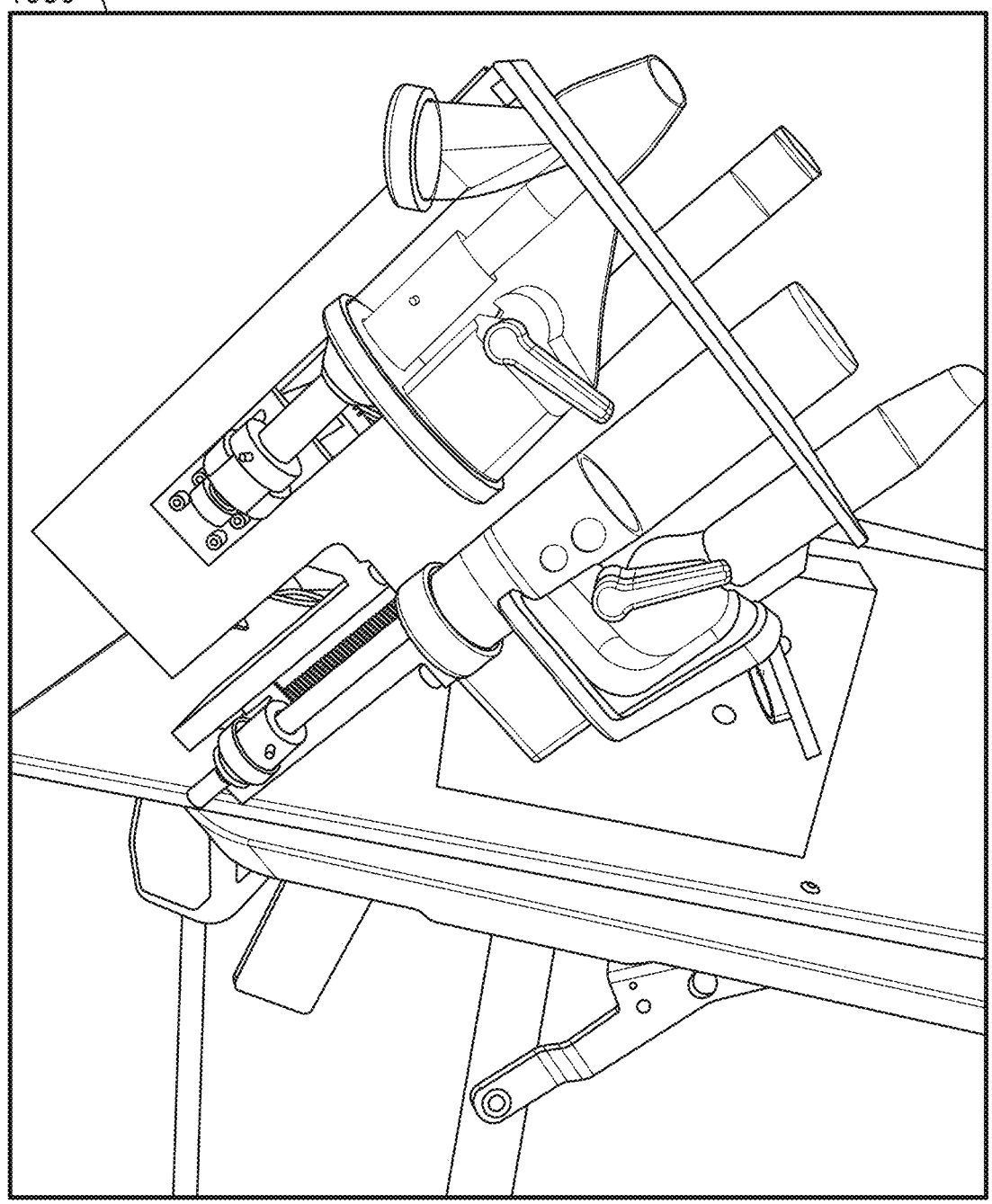

As shown in FIG. 10B and FIG. 10C, the designed cartridge was loaded into a tilting assembly 1050 of an ultrasonic processing device. The tilting assembly is shown outside of the ultrasonic processing device to facilitate the demonstration of tilting the cartridge. In a method of obtaining separated individual cells from a biological sample, the biological sample and a cell media buffer were loaded into the cartridge via a sealable port of the sample processing unit. The cap was placed on the sealable port of the sample processing unit. The mincer was repetitively lowered into the sample chamber to process the biological sample. With the first gate positioned to allow material flow from the sample chamber to the reaction chamber, but not from the reaction chamber to the filtration chamber, the tilting actuator of the tilting assembly 1050 was activated such that the cartridge was tilted to move the material in the sample chamber to the reaction chamber. The tilting actuator of the tilting assembly 1050 was then activated such that the cartridge was positioned at a home position (the home position being such that the reaction chamber would be positioned relative to an ultrasonic transducer when the tilting assembly is in the ultrasonic processing device). With the first gate positioned to allow material flow from the reaction chamber to the filtration chamber and the filtration device in a lifted position (FIG. 10B), the tilting actuator of the tilting assembly 1050 was activated such that the cartridge was tilted to move the material in the reaction chamber to the filtration chamber. The filtration device was repetitively lowered into the filtration chamber to separate individual cells by allowing them to flow through the cell-filter mesh. With the second gate positioned to allow material flow from the filtration chamber to the collection unit via the third channel, the tilting actuator of the tilting assembly 1050 was activated such that the cartridge was tilted to move the filtered material from the filtration chamber to the collection unit. The filtration device may receive a final depression when the cartridge is tilted in this position to allow for any final material (e.g., separated individual cells and cell media) to move from the processed biological sample, or a portion thereof, to the collection unit.

The method may be repeated to further process the biological sample to obtain separated individual cells therefrom. In such embodiments, additional cell media was added to the cartridge via the sealable port.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A cartridge for dissociating and obtaining separated individual cells from a biological sample, the cartridge comprising:
    (a) a sample processing unit comprising:
        a sealable port with a removable cap configured to receive the biological sample for introduction to the sample processing unit;
        a sample chamber configured to collect the biological sample; and
        a mincer,
            wherein the mincer is configured to interface with the sample chamber;
    (b) a reaction unit comprising a reaction chamber configured to receive ultrasonic energy via a temperature-controlled, fluid coupling medium from a transducer assembly located outside of the cartridge in an ultrasonic processing device,
        wherein the sample processing unit and the reaction unit are connected via a first channel;
    (c) a filtration unit comprising:
        a filtration chamber; and
        a filtration device comprising a tubular assembly with a cell filter covering a bottom opening of the tubular-assembly, wherein the tubular assembly is configured to enter the filtration chamber,
            wherein the reaction chamber and the filtration unit are connected via a second channel; and
    (d) a collection unit configured to receive the separated individual cells from the biological sample,
        wherein the filtration unit and the collection unit are connected via a third channel;
    (e) one or more gates,
        wherein each gate is configured to control a fluidic connection between any one or more of: the sample processing unit and the reaction unit via the first channel; the reaction unit and the filtration unit via the second channel; and the filtration unit and the collection unit via the third channel,
    wherein the cartridge is configured to be loadable into the ultrasonic processing device.

2. The cartridge of claim 1, wherein the first channel, the second channel, and the third channel are positioned and configured such that flow between the sample processing unit, the reaction unit, the filtration unit, and the collection unit is controlled by tilting of the cartridge.

3. The cartridge of claim 1, wherein the one or more gates comprises a first gate configured to be position in a first location and a second location, wherein when the first gate is positioned in a first position the sample processing unit and the reaction unit are fluidically connected via the first channel, and wherein when the first gate is positioned in a second position the reaction unit and the filtration unit are fluidically connected via the second channel.

4. The cartridge of claim 1, wherein the one or more gates comprises a second gate configured to be position in a first location and a second location, wherein when the second gate is positioned in a first position the filtration unit and the collection unit are not fluidically connected, and wherein when the second gate is positioned in a second position the filtration unit and the collection unit are fluidically connected.

5. The cartridge of claim 1, wherein the reaction chamber of the reaction unit comprises a bottom surface that is acoustically conductive.

6. The cartridge of claim 5, wherein the bottom surface of the reaction chamber is substantially flat.

7. The cartridge of claim 1, wherein the filtration device of the filtration unit comprises the tubular assembly, wherein an outer surface of the tubular assembly is configured to provide a seal with a side wall of the filtration chamber, wherein the tubular assembly comprises the cell filter covering a bottom opening of the tubular assembly, wherein the tubular assembly is configured to be telescopically inserted into the filtration chamber containing the biological sample, or a portion thereof, and wherein the cell filter is configured to compress the biological sample, or a portion thereof, to expel the individual cells from the biological sample when the filtration device is fully inserted into the filtration chamber.

8. The filtration device of claim 7, wherein the tubular assembly is configured such that the cells are expelled into a surrounding aqueous fluid that flows into a center of the tubular assembly through the cell filter.

9. The cartridge of claim 7, wherein the side wall of the filtration chamber is cylindrical.

10. The cartridge of claim 7, wherein the filtration chamber of the filtration unit comprises a bottom surface having a convex structure.

11. The cartridge of claim 1, wherein the filtration unit comprises a vent.

12. The cartridge of claim 1, wherein the collection unit is configured to receive a removable collection device comprising an Eppendorf tube for receiving single cells from the biological sample.

13. The cartridge of claim 1, wherein the cartridge is configured to be loadable into the ultrasonic processing device having a radio frequency (RF) generator and RF amplifier to drive the transducer assembly.

* * * * *